(12) United States Patent
Strickholm

(10) Patent No.: US 11,151,487 B2
(45) Date of Patent: Oct. 19, 2021

(54) GOAL TRACKING SYSTEM AND METHOD

(71) Applicant: KnowledgeDNA Incorporated, Santa Barbara, CA (US)

(72) Inventor: Stefan Edward Strickholm, Santa Barbara, CA (US)

(73) Assignee: KnowledgeDNA Incorporated, Santa Barbara, CA (US)

( * ) Notice: Subject to any disclaimer, the term of this patent is extended or adjusted under 35 U.S.C. 154(b) by 0 days.

(21) Appl. No.: 14/105,090

(22) Filed: Dec. 12, 2013

(65) Prior Publication Data

US 2014/0172480 A1 Jun. 19, 2014

Related U.S. Application Data

(60) Provisional application No. 61/737,056, filed on Dec. 13, 2012.

(51) Int. Cl.
*G06Q 10/06* (2012.01)

(52) U.S. Cl.
CPC ............................ *G06Q 10/063114* (2013.01)

(58) Field of Classification Search
CPC .............................................. G06Q 10/063114
USPC ......................................................... 705/7.15
See application file for complete search history.

(56) References Cited

U.S. PATENT DOCUMENTS

| | | | |
|---|---|---|---|
| 7,113,933 B1 * | 9/2006 | Imholte | 705/7.15 |
| 7,848,947 B1 * | 12/2010 | McGloin | G06Q 10/06398 705/7.42 |
| 8,108,250 B1 * | 1/2012 | Moore | G06Q 10/0639 700/111 |
| 8,286,092 B2 * | 10/2012 | Hintermeister | G06F 9/4443 700/100 |
| 8,468,047 B2 * | 6/2013 | Koller | G06Q 10/0639 705/7.42 |
| 9,183,560 B2 * | 11/2015 | Abelow | G06Q 10/067 |
| 9,560,156 B1 * | 1/2017 | Rana | H04L 67/306 |
| 10,523,622 B2 * | 12/2019 | Barfield, Jr. | H04L 51/14 |
| 2002/0035500 A1 * | 3/2002 | Yoko | G06Q 10/06 705/7.13 |
| 2002/0072954 A1 * | 6/2002 | Sales | G06Q 10/02 705/7.29 |
| 2002/0165757 A1 * | 11/2002 | Lisser | G06Q 10/04 705/7.37 |
| 2003/0120538 A1 * | 6/2003 | Boerke | G06Q 10/063114 705/7.15 |
| 2003/0182167 A1 * | 9/2003 | Kalthoff | G06F 17/30604 705/7.27 |
| 2007/0067198 A1 * | 3/2007 | Eggleston | G06Q 10/06311 705/7.15 |
| 2007/0244736 A1 * | 10/2007 | Johnson | G06Q 10/0633 705/7.21 |
| 2010/0030565 A1 * | 2/2010 | Holt | G06Q 10/063114 705/7.15 |
| 2010/0325207 A1 * | 12/2010 | Churchill | H04L 51/14 709/204 |

(Continued)

*Primary Examiner* — Folashade Anderson

(57) ABSTRACT

In a computer-implemented method for goal tracking goal tracking information is accessed, wherein the goal tracking information comprises user activities and contact information associated with said the activities. Goal tracking information is automatically correlated. A report comprising the goal tracking information is periodically and automatically generated.

20 Claims, 17 Drawing Sheets

(56) References Cited

U.S. PATENT DOCUMENTS

| | | | |
|---|---|---|---|
| 2013/0018689 A1* | 1/2013 | Guicciardi | G06Q 10/0639 705/7.15 |
| 2013/0138716 A1* | 5/2013 | Macwan | G06Q 30/02 709/203 |
| 2013/0332213 A1* | 12/2013 | Heggen | G06Q 10/101 705/7.15 |
| 2015/0154667 A1* | 6/2015 | Hicks | G06Q 30/0279 705/26.41 |
| 2016/0012376 A1* | 1/2016 | Rainisto | G06Q 10/063114 705/7.15 |
| 2016/0063550 A1* | 3/2016 | Caldwell | G06Q 30/0261 705/14.53 |
| 2016/0117644 A1* | 4/2016 | Harsch | G06Q 10/1095 705/7.19 |
| 2016/0133140 A1* | 5/2016 | King | G06Q 30/0278 434/127 |
| 2017/0116552 A1* | 4/2017 | Deodhar | G06Q 10/06316 |

* cited by examiner

KnowledgeDNA™ Transparent Accountability

210 {
| Click Here To Update TO DOs | Group Discussion | Support |
| --- | --- | --- |
| | KDNA Login | Contact Leader |

212 {
My Contact Tracker:
| Overdue | Benjamin Richards | Sun | 10:00 am | 2-Way Contact |
| --- | --- | --- | --- | --- |
| | David Jones | Wed | 12:30 pm | 1-Way Contact |
| Today: | Beatrix Potter | Today | 9:00 am | Open House |
| This Week: | John Wayne | Fri | 8:00 am | Buyer Appointment |
| | Danica Patrick | Sat | 12:30 pm | Listing Appointment |

214 {
My Conversion Ratios
100 – 2-Way Contacts
Produce 1 – Sales Closed (Avg. $6,000)
Value of 1 – 2-Way Contact: $60.00

216 {
My Business Plan: Activated
Goal: 30 # Sales Closed – 45 Work Weeks - $180,000

218 {
My Productivity Score
AVG Efficiency Ratio: 81% X AVG Activity: 101% = My Productivity Score: 82%
My Productivity Score: 82% X Target Income: $180,000 = Current Projected Income: $147,600

220 {
Scoreboard:
Name:            Steve Smith
Template:        Agent Business Development
Leader:          Frank Anderson – Weekly – Alerts Every Day
Current Status:  43%
Rank:            10 of 15
Deadline:        Weekly – Midnight PST – Sunday 11/24

222 {
Click Here to Update TO DOs
Steve's To Dos Status:

| To Do | Actuals | Goal | Status |
| --- | --- | --- | --- |
| # 2-Way Contacts (Voice to Voice) | 12 | 50 | P 24% |
| # New Into DBase | 6 | 10 | P 60% |
| # Open Houses Held | 1 | 1 | P 100% |
| # Buyer Appts. | 5 | 3 | P 166% |
| # Listing Appts. | 0 | 1 | P 0% |
| # Sales Opened | 0 | 0.70 | P 0% |
| # Sales Closed | 0 | 0.58 | P 0% |
| # Sales Meetings/Trainings | 0 | 1 | P 0% |

Click Here to Update TO DOs

KnowledgeDNA™ Transparent Accountability

310: Group Discussion | Comment Tracker | Mobile View | Contact Tracker
KDNA Login | Training | Contact Leader | New Contact Integrated Activity & Contact Tracker Update Screen:

312: Save Changes | Cancel Changes
Enter Online | Update 2 Weeks Ago | Update Last Week | Current Week    Deadline: 8/18/2013

322 — Weekly Cumulative Numbers   Goals set by Business Plan

320:

| To Do | | Comment | Actual | Goal | Status |
|---|---|---|---|---|---|
| Average Total | | | | 324 | 22% |
| # Trainings Attended WK. | On | More Info | 1.0 | 1.0 | 100% |
| # Hrs. Script Practice / Role Play | On | More Info | 0 | 2 | 0% |
| # Hrs. ACTUAL Contacting This Week | On | More Info | 0 | 8 | 0% |
| # Doors Knocked On | On | More Info | 49 | 80 | 61% |
| # 1-Way Contacts (Dials, Emails, etc.) | On | More Info | 0 | 80 | 0% |
| # 2-Way Contacts (Voice to Voice, etc.) | On | More Info | 12 | 40 | 30% |

330: Activity & Contact Tracker: 1. Actuals to Add: [1]   Progress 12 to 13 of 40 = 33%

332: 2. Contact:
First: __Julie_____ Last: __Christy_____ Office: _____ Company: _____
Email: JChristy@gmail.com   Mobile: 310-345-6789   Class: [Prospect]   Priority: [1]

334: 3. Next Activity Follow Up: [1-Way Contacts (Dials, Emails, etc.)]   [Other]
Date: ☐ [08/21/13]   Time: [10:30 am]   OR Remind Me: [3 days/1 Wk./etc.]

336: 4. Comment:

Met with Julie Christy today after the Charity Event I went to today. She and her husband are interested in working with me. I will send her an email with a Market Analysis for their zip code area on 8/21.

338: 5. Send Alerts (6):   [X] Yes   [ ] No   Show

Save and Close | Save and Add Another | Cancel

*FIG. 3A*

My Contact Tracker:

Overdue      Benjamin Richards   Sun     10:00 am    2-Way Contact
             David Jones         Wed     12:30 pm    1-Way Contact
Today:       Beatrix Potter      Today   9:00 am     Open House
This Week:   John Wayne          Fri     8:00 am     Buyer Appointment
             Danica Patrick      Sat     12:30 pm    Listing Appointment My Conversion Ratios
100 – 2-Way Contacts
Produce 1 – Sales Closed (Avg. $6,000)
Value of 1 – 2-Way Contact: $60.00

My Business Plan: Activated
Goal: 30 # Sales Closed – 45 Work Weeks - $180,000

My Productivity Score
AVG Efficiency Ratio: 81% X AVG Activity: 101% = My Productivity Score: 82%
My Productivity Score: 82% X Target Income: $180,000 = Current Projected Income: $147,600

My Goal Tracker:
Team Achieve

350:

| Current Rank (Click to View) | # 2-Way Contacts (Voice to Voice) | # Sales Closed | Avg. All Goals |
|---|---|---|---|
| 1. Susan Hawes | 144 | 2 | 177% |
| 2. John Dorosmith | 111 | 2 | 173% |
| 3. Susan Wong | 22 | 0 | 48% |
| 4. Steve Smith | 12 | 0 | 43% |
| 5. G. Washington | 0 | 0 | 0% |

All Teams:

352:

| Current Rank | # 2-Way Contacts (Voice to Voice) | # Sales Closed | Avg. All Goals |
|---|---|---|---|
| Totals: Actuals | 500 | 6 | 59% |
| 1. Team Achieve | 289 | 4 | 89% |
| 2. Power Curve | 100 | 1 | 50% |
| 3. Team Cool Cats | 111 | 1 | 38% |

To Do Current Ranks:
(Gold Star = Improvement from Current to the one before)

354:

| Current Rank (Click to View) | To Dos | Updates | Total Avg. |
|---|---|---|---|
| 1. Susan Hawes ★ | 8 | 0 | 177% |
| 2. John Dorosmith ★ | 7 | 0 | 173% |
| 3. Kathy Gaddis | 8 | 0 | 143% |
| 4. MaryAnn Callas | 7 | 0 | 126% |
| 5. John Darlington ★ | 8 | 0 | 114% |
| 6. Joseph Coleman | 7 | 0 | 73% |
| 7. Joe Floyd | 8 | 0 | 71% |
| 8. Lynn Thomas | 8 | 0 | 54% |
| 9. Susan Wong ★ | 8 | 0 | 48% |
| 10. Steve Smith | 8 | 6 | 43% |
| 11. Jacqueline Roberts | 8 | 0 | 19% |
| 12. Thomas Jefferson | 7 | 0 | 0% |
| 13. G. Washington | 8 | 2 | 0% |
| 14. Staci Johnson | 8 | 2 | 0% |

Filters:

| Priority | Fup Date | Next | Last | Lag | Office | Company |
|---|---|---|---|---|---|---|
| Next Follow Up | Remind Me | First Initial | Last Initial | Class | Referred By | Status |

Showing 1-16 of 92: 1    Search Name: [        ]

Add New Contact ← 400

| Priority | First Name | Last Name | Fup Date | Time | Next | Last | Lag | Office | Company | # Comments |
|---|---|---|---|---|---|---|---|---|---|---|
| 1 | Jacob | Smith | 08/8/13 | 10:30 am | -8 Days | -16 Days | 16 Days | Los Altos | Coldwell B | 22 |
| 2 | Julie | Christy | 08/16/13 | 2:00 pm | 0 | -4 | 4 | Victorville | Town & C | 31 |

⇒ Current Activity: [ 2-Way Contacts (Voice to Voice, etc.) ]    Actuals to Add: [1]    Progress 12 to 13 of 40 = 33%    View All Contact Info:    Email    Text    Mobile: 812-456-7890    Business: 450-543-1245    Home: 213-678-3409

Next Follow Up: [ 1-Way Contacts (Dials, Emails, etc.) ]    Priority: [1]    Status: [ Active/Inactive/Delete ]    Class: [ Client/Rep/etc. ]

Date: [ 08/21/13 ]    Time: [ 10:30 am ]    OR Remind Me: [ 3 days/1 Wk./etc. ]

Met with Julie Christy today after the Charity Event I went to today. She and her husband are interested in working with me. I will send her an email with a Market Analysis for their zip code area on 8/21.

Send Alerts (6):    [X] Yes    [ ] No    Show    Save and Close    Cancel

⇒ Comments    Comments    Staus Changes    All Updates

31. Susan Jones 8/12/2013 3:08:39 PM
Good talk with Francis and new manager.

30. Steve Smith 7/31/2013 10:10:32 PM
We are going to need some additional marketing information for them about our company.
I will talk to our Marketing person, to see what materials we have, maybe they can help with an office presentation!

29. Steve Smith 7/31/2013 9:54:04 PM
Met with Francis and Jeff, her Asst. They want to know more about our company. Will ask Susan to follow up next week.
We probably need a month or so to get this new working relationship put together.
Should be a good opportunity, Francis closes over 50 transactions per year!

| 3 | Peter | Flores | 09/04/13 | 2:00 pm | 18 | -32 | 50 | Marysville | Intero | 2 |
| 1 | Terry | Goldsmith | 09/05/13 | Reminder | 25 | -11 | 26 | San Mateo | Coldwell B | 14 |
| 5 | Alice | Toklas | 09/06/13 | Reminder | 27 | -88 | 115 | Palmdale | Keller Will | 8 |
| Avg. | | | | | Avg. | Avg. | Avg. | | | Avg. |

| 2 Wks | 1 Wk | Current | | | Deadline: 8/18/2013 |

[ Save Changes ]    [ Cancel ]

| My To Dos | Actuals | Goals | Status |
|---|---|---|---|
| # 2-Way Contacts (Meet/Call/Write/Knocks) | | | |
| [ New Post ] | 42 | 50 | 84% |
| # New Into Dbase | | | |
| [ New Post ] | 4 | 20 | 20% |

Actuals to Add: [ 2 ]    +++ | + | None

From 4 to 6 of 20 = 30%

F: _____  L: _____
Off.: _____  Co.: _____
Em: _____
M: _____  [ Prospect ]  P: [ 1 ]

F: _____  L: _____
Off.: _____  Co.: _____
Em: _____
M: _____  [ Seller ]  P: [ 2 ]

Next Fup:  [ 2-Way Contacts (Voice to Voice) ]
Date: [ 08/21/13 ]  Time: [ 10:30 am ]
OR Remind Me: [ 3 Days / 1 Wk. / 2 Wks. / etc. ]

Added 2 new people to my dbase today from Open House I held.

Send Alerts (6):    [X] Yes    [ ] No    Show

[ Save and Close ]    [ Save + Another ]    [ Cancel ]

FIG. 4B

| Comment Tracker | My Scoreboard | | | |
|---|---|---|---|---|
| Week Ending ▶ 11/17/2013 | | ▶ Update To Dos | | |
| Comments   Status Changes   All updates | | | | |

To Dos

| | | Comments | | |
|---|---|---|---|---|
| 1.) | # 2-Way Contacts (Voice to Voice) | New Post | Comments: 3   StatusChanges: 14   Actuals: 12   Goal: 50   Progress: 24% | |

Page 1 of 1

| 172.) | SteveSmith Door knocking, tt Frank A. and Julie R., set listing appt. with Frank for next MON at 1 pm. | 11/14/2013 11:19 AM |
|---|---|---|
| 171.) | SteveSmith Visited ReMax office today, set up lunch and team with Bob A., Julie R., and Karen K. Set for WED at Noon. | 11/11/2013 2:14 PM |
| 170.) | SteveSmith Dropped by Realty One, office, set up lunch meeting with Alice K. and Julie R. | 11/11/2013 11:22 AM |

| 2.) | # New Into DBase | New Post | Comments: 0   StatusChanges: 2   Actuals: 6   Goal: 10   Progress: 60% |
|---|---|---|---|
| 3.) | # Open Houses Held | New Post | Comments: 0   StatusChanges: 3   Actuals: 1   Goal: 1   Progress: 100% |
| 4.) | # Buyer Appts. | New Post | Comments: 0   StatusChanges: 2   Actuals: 5   Goal: 3   Progress: 166% |
| 5.) | # Listing Appts. | New Post | Comments: 0   StatusChanges: 6   Actuals: 0   Goal: 1   Progress: 0% |
| 6.) | # Sales Opened | New Post | Comments: 0   StatusChanges: 3   Actuals: 1   Goal: 0.7   Progress: 142% |
| 7.) | # Sales Closed | New Post | Comments: 0   StatusChanges: 1   Actuals: 0   Goal: 0.58   Progress: 0% |
| 8.) | # Sales Meetings/Trainings | New Post | Comments: 0   StatusChanges: 8   Actuals: 0   Goal: 1   Progress: 0% |

| Recurring Template: | Agent Business Development ▶ | | | Select Action: | | --- Select Action --- ▶ | | |
|---|---|---|---|---|---|---|---|---|
| Starting Date: | 10/10/2010 ▶ | | | Template Status: | | Active ▶ | | |
| Ending Date: | 11/17/2013 ▶ | | | Primary Filter: | | -- No Filter -- ▶ | | |
| Team: | --All Teams-- ▶ | | | Secondary Filter: | | -- No Filter -- ▶ | | |
| | --All Teams-- | | | | | | | |
| | Team Cool Cats | | | | | | | |
| | Team Achieve | | | Group Time Series | | | | |
| | Power Curve | | | | | | | |

Group Scoreboard Current Results:

☐ 0% to 5%  ☐ 5% to 49%  ☐ 50% to 99%  ☐ 100% to 149%  ☐ 150%+

View: Actuals ▶    Cumulative | Last Period | Current Period    Show All | Stars Only
Number of Periods: 1

| | Users | %Avg. | 1 | 2 | 3 | 4 | 5 | 6 | 7 | 8 |
|---|---|---|---|---|---|---|---|---|---|---|
| | Group AVG | 69% | 41.40 | 6.93 | 1.53 | 1.71 | 1.07 | 0.73 | 0.47 | 0.85 |
| ★ | Susan Hawes | 177% | 144.00 | 22.00 | 2.00 | 4.00 | 5.00 | 2.00 | 2.00 | 2.00 |
| ★ | John Dorosmith | 173% | 111.00 | 22.00 | 3.00 | | 5.00 | 2.00 | 2.00 | 5.00 |
| | Kathy Gaddis | 143% | 44.00 | 6.00 | 2.00 | 1.00 | 0.00 | 1.00 | 1.00 | 0.00 |
| | MaryAnn Callas | 126% | 66.00 | 6.00 | 2.00 | 2.00 | | 2.00 | 1.00 | 2.00 |
| ★ | John Darlington | 114% | 111.00 | 15.00 | 3.00 | 6.00 | 3.00 | 2.00 | 1.00 | 2.00 |
| | Joseph Coleman | 73% | 33.00 | 16.00 | 3.00 | 2.00 | 1.00 | 1.00 | 0.00 | 0.00 |
| | Joe Floyd | 71% | 44.00 | 4.00 | 1.00 | 2.00 | 1.00 | 0.00 | 0.00 | 0.00 |
| | Lynn Thomas | 54% | 12.00 | 3.00 | 2.00 | 0.00 | 0.00 | 0.00 | 0.00 | 0.00 |
| ★ | Susan Wong | 48% | 22.00 | 3.00 | 3.00 | 0.00 | 0.00 | 0.00 | 0.00 | 0.00 |
| | Steve Smith | 43% | 12.00 | 6.00 | 1.00 | 5.00 | 0.00 | 0.00 | 0.00 | 0.00 |
| | Jacqueline Roberts | 19% | 22.00 | 1.00 | 0.00 | 1.00 | 0.00 | 0.00 | 0.00 | 0.00 |
| | G. Washington | 0% | 0.00 | 0.00 | 0.00 | 0.00 | 0.00 | 0.00 | 0.00 | 0.00 |
| | Staci Johnson | 0% | 0.00 | 0.00 | 0.00 | 0.00 | 0.00 | 0.00 | 0.00 | 0.00 |
| | Terry Kalliper | 0% | 0.00 | 0.00 | 0.00 | 0.00 | 0.00 | 0.00 | 0.00 | 0.00 |
| | Thomas Jefferson | 0% | 0.00 | 0.00 | 0.00 | 0.00 | 0.00 | 0.00 | 0.00 | 0.00 |
| | Actual Totals | | 621.00 | 104.00 | 23.00 | 24.00 | 15.00 | 11.00 | 7.00 | 11.00 |

Group Scoreboard Time Period Results – Single To Dos

View: Actuals ▶
☐ 0% to 5%  ☐ 5% to 49%  ☐ 50% to 99%  ☐ 100% to 149%  ☐ 150%+

Number: Actuals
Goals
Percentages

2-Way Contacts (Voice to Voice) ▶

| Users | Avg | 08/04 | 08/11 | 08/18 | 08/25 | 09/01 | 09/08 | 09/15 | 09/22 | 09/29 | 10/06 | 10/13 | 10/20 | 10/27 | 11/03 | 11/10 | 11/17 | 11/24 | 12/01 | 12/08 |
|---|---|---|---|---|---|---|---|---|---|---|---|---|---|---|---|---|---|---|---|---|
| Group AVG | 56% | 68% | 49% | 36% | 51% | 70% | 65% | 56% | 63% | 75% | 72% | 75% | 70% | 4% | 32% | 62% | 64% | 67% | 4% | 67% |
| John Dorosmith | 120% | 112.0 | 82.0 | 44.0 | 112.0 | 111.0 | 88.0 | 88.0 | 88.0 | 111.0 | 88.0 | 125.0 | 125.0 | 0.0 | 77.0 | 111.0 | 111.0 | 111.0 | 0.0 | 111.0 |
| Kathy Gaddis | 96% | 23.0 | 33.0 | 33.0 | 33.0 | 33.0 | 33.0 | 44.0 | 23.0 | 12.0 | 12.0 | 12.0 | 45.0 | 0.0 | 33.0 | 12.0 | 22.0 | 44.0 | 0.0 | 33.0 |
| Susan Hawes | 74% | 122.0 | 0.0 | 1.0 | 33.0 | 114.0 | 112.0 | 112.0 | 135.0 | 156.0 | 122.0 | 135.0 | 111.0 | 0.0 | 0.0 | 23.0 | 144.0 | 144.0 | 0.0 | 136 |
| MaryAnn Callas | 70% | 55.0 | 0.0 | 0.0 | 12.0 | 22.0 | 77.0 | 66.0 | 34.0 | 45.0 | 77.0 | 45.0 | 45.0 | 0.0 | 12.0 | 67.0 | 22.0 | 66.0 | 0.0 | 55.0 |
| Lynn Thomas | 66% | 1.0 | 1.0 | 0.0 | 33.0 | 66.0 | 34.0 | 3.0 | 33.0 | 55.0 | 44.0 | 66.0 | 44.0 | 0.0 | 55.0 | 67.0 | 22.0 | 12.0 | 0.0 | 77.0 |
| John Darlington | 61% | 55.0 | 111.0 | 111.0 | 33.0 | 55.00 | 33.0 | 22.0 | 45.0 | 55.0 | 78.0 | 66.0 | 111.0 | 0.0 | 45.0 | 55.0 | 66.0 | 111.0 | 0.0 | 77.0 |
| Steve Smith | 53% | 50.0 | 40.0 | 42.0 | 34.0 | 20.0 | 17.0 | 21.0 | 18.0 | 22.0 | 22.0 | 25.0 | 15.0 | 37.0 | 16.0 | 55.0 | 12.0 | 12.0 | 30.0 | 18.0 |
| Joe Floyd | 49% | 0.0 | 0.0 | 0.0 | 0.0 | 33.0 | 44.0 | 33.0 | 44.0 | 66.0 | 44.0 | 14.0 | 4.0 | 0.0 | 0.0 | 55.0 | 12.0 | 44.0 | 0.0 | 66.0 |
| Staci Johnson | 49% | 55.0 | 44.0 | 55.0 | 22.0 | 22.0 | 12.0 | 22.0 | 55.0 | 55.0 | 55.0 | 56.0 | 34.0 | 0.0 | 0.0 | 12.0 | 22.0 | 0.0 | 0.0 | 12.0 |
| Susan Wong | 46% | 55.0 | 50.0 | 0.0 | 0.0 | 77.0 | 55.0 | 25.0 | 65.0 | 56.0 | 65.0 | 23.0 | 56.0 | 0.0 | 44.0 | 33.0 | 55.0 | 22.0 | 15.0 | 12.0 |
| Jacqueline Roberts | 42% | 33.0 | 22.0 | 33.0 | 44.0 | 22.0 | 11.0 | 22.0 | 8.0 | 22.0 | 11.0 | 22.0 | 12.0 | 0.0 | 22.0 | 22.0 | 44.0 | 22.0 | 0.0 | 22.0 |
| Joseph Coleman | 39% | 20.0 | 44.0 | 0.0 | 34.0 | 0.0 | 55.0 | 22.0 | 23.0 | 12.0 | 66.0 | 56.0 | 33.0 | 0.0 | 0.0 | 55.0 | 66.0 | 33.0 | 0.0 | 66.0 |
| Terry Kalliper | 28% | 22.0 | 12.0 | 0.0 | 66.0 | 45.0 | 0.0 | 15.0 | 23.0 | 34.0 | 34.0 | 16.0 | 78.0 | 0.0 | 0.0 | 15.0 | 0.0 | 0.0 | 0.0 | 0.0 |

User: Steve Smith ▶

User Edit Goals: Yes ⓘ

| Comment Tracker | My Scoreboard |
|---|---|

☐ 0% to 5%  ☐ 5% to 49%  ☐ 50% to 99%  ☐ 100% to 149%  ☐ 150%+  Weekly View | Monthly View | Update To Dos Scroll To Change Months: ☐

| Using This Screen... | Deadline: 11/17/2013 | | | | Deadline: 11/10/2013 | | | | Deadline: 11/3/2013 | | | | Deadline: 10/27/2013 | | | |
|---|---|---|---|---|---|---|---|---|---|---|---|---|---|---|---|---|
| ⓘ To Dos | Actuals | Goals | Gap | % | Actuals | Goals | Gap | % | Actuals | Goals | Gap | % | Actuals | Goals | Gap | % |
| 1.) # 2-Way Contacts (Voice to Voice) | 12 | 50 | -38 | 24% | 55 | 50 | 5 | 110% | 16 | 50 | -34 | 32% | 37 | 50 | -13 | 74% |
| 2.) # New Into DBase | 6 | 10 | -4 | 60% | 6 | 10 | -4 | 60% | 10 | 10 | 0 | 100% | 5 | 10 | -5 | 50% |
| 3.) # Open Houses Held | 1 | 1 | 0 | 100% | 2 | 1 | 1 | 200% | 1 | 1 | 0 | 100% | 1 | 1 | 0 | 100% |
| 4.) # Buyer Appts. | 5 | 3 | 2 | 167% | 5 | 3 | 2 | 167% | 5 | 3 | 2 | 167% | 2 | 3 | -1 | 67% |
| 5.) # Listing Appts. | 0 | 1 | -1 | 0% | 1 | 1 | 0 | 100% | 1 | 1 | 0 | 100% | 2 | 1 | 1 | 200% |
| 6.) # Sales Opened | 1 | 0.7 | 0.3 | 143% | 1 | 0.7 | 0.3 | 143% | 1 | 0.7 | 0.3 | 143% | 2 | 0.7 | 1.3 | 286% |
| 7.) # Sales Closed | 0 | 0.58 | -0.58 | 0% | 0 | 0.58 | -0.58 | 0% | 1 | 0.58 | 0.42 | 172% | 1 | 0.58 | 0.42 | 172% |
| 8.) # Sales Meetings Trainings | 0 | 1 | -1 | 0% | 1 | 1 | 0 | 100% | 0 | 1 | -1 | 0% | 1 | 1 | 0 | 100% |

AVG Activity – Actuals vs. Goals: 62%  110%  102%  131%

Calculate AVG Activity Based on Most Recent Period of: [ 4 Weeks ]

Most Recent AVG Activity (4 Weeks): - 101%

700 ⟶

Group Conversion Ratios 75.2 - # 2-Way Contacts (Voice to Voice)

Produce 1 - # Sales Closed (Avg. $5,000)

Value of 1 - # 2-Way Contacts (Voice to Voice): $66.51

Group Predictive Ratios

Number of Periods: 167

Calculate For: | All Users ▶ |
| --- |
| All Users |
| G. Washington |
| John Dorosmith |
| Steve Smith |
| Susan Hawes |
| Susan Wong |

| To Dos | Actual Totals | 1 | 2 | 3 | 4 | 5 | 6 | 7 | 8 |
| --- | --- | --- | --- | --- | --- | --- | --- | --- | --- |
| 1. # 2-Way Contacts (Vo | 23,003.5 | | | | | | | | |
| 2. # New Into DBase | 3,060.0 | 7.5 | | | | | | | |
| 3. # Open Houses Held | 843.0 | 27.3 | 3.6 | | | | | | |
| 4. # Buyer Appts. | 1,075.0 | 21.4 | 2.8 | 0.784 | | | | | |
| 5. # Listing Appts. | 723.0 | 31.8 | 4.2 | 1.2 | 1.5 | | | | |
| 6. # Sales Opened | 387.5 | 59.4 | 7.9 | 2.2 | 2.8 | 1.9 | | | |
| 7. # Sales Closed | 306.0 | 75.2 | 10.0 | 2.8 | 3.5 | 2.4 | 1.3 | | |
| 8. # Sales Meetings/Tra | 531.0 | 43.3 | 5.8 | 1.6 | 2.0 | 1.4 | 0.730 | 0.576 | |

*FIG. 8A*

Standard Conversion Ratios – Actuals vs. Existing Weekly Goals:

☐ No Data   ☐ 1% to 49%   ☐ 50% to 99%   ☐ 100% to 149%   ☐ 150%+

Auto-Reset Current Goals Every: [ 2 Weeks ]   Reset Now   Goal Total # Transactions: 30

| User Name: | Steve Smith/... | | | | Avg. Outcome Value: | $6,000 |

Toatal weeks: 12

| No. | Input vs. Outcome To Dos | Cumulative History | Existing Weekly | Efficiency Ratio | | % Return | | Actuals v. Goals | For One Input To |
|---|---|---|---|---|---|---|---|---|---|
| | | Actuals | Goals | Actuals | Goals | Actuals | Goals | %Ratio | $R |
| 1 | # 2-Way Contacts | 200 | 50 | 100.0 | 52.1 | 1.00% | 1.92% | 52% | $60 |
| | # Sales Closed | 2 | 0.96 | | | | | | |
| 2 | # New Into DBase | 50 | 50 | 25.0 | 10.4 | 4% | 9.60% | 42% | $240 |
| | # Sales Closed | 2 | 0.96 | | | | | | |
| 3 | # Open Houses | 2 | 1 | 1.0 | 1.0 | 100% | 96% | 104% | $6,000 |
| | # Sales Closed | 2 | 0.96 | | | | | | |
| 4 | # Buyer Appts. | 4 | 3 | 2.0 | 3.1 | 50% | 32% | 156% | $3,000 |
| | # Sales Closed | 2 | 0.96 | | | | | | |
| 5 | # Listing Appts. | 10 | 2 | 5.0 | 2.1 | 20% | 48% | 42% | $1,200 |
| | # Sales Closed | 2 | 0.96 | | | | | | |
| 6 | # Sales Opened | 3 | 1 | 1.5 | 1.0 | 67% | 96% | 69% | $4,000 |
| | # Sales Closed | 2 | 0.96 | | | | | | |
| 8 | # Sales Training | 2 | 1 | 1.0 | 1.0 | 100% | 96% | 104% | $6,000 |
| | # Sales Closed | 2 | 0.96 | | | | | | |

AVG Efficiency Ratio – Actuals vs. Goals:   81%

Based on My Recent Period of:   [ 12 Weeks ]

Most Recent AVG Efficiency Ratio (12 Weeks):   81%
                                                X
Most Recent AVG Activity (4 Weeks):   101%

My Productivity Score:   82%
                          X
Target Annual Income:   $180,000
(30 Sales at $6,000)

Current Projected Income:   $147,600
(82% of $180,000)

Productivity Formula:
AVG Efficiency X AVG Activity = Productivity Score

*FIG. 8B*

Productivity Tracker: Efficiency Ratios & Activity – Individual vs. Group/Team AVG:

☐ No Data  ☐ 1% to 49%  ☐ 50% to 99%  ☐ 100% to 149%  ☐ 150%+

View: Productivity Score | Efficiency Ratio - % Return | Input TO DO -- $ Return View: Own Goals AVG | Total Goals AVG Total Weeks: 12

| Users | % vs. AVG | 1 | 2 | 3 | 4 | 5 | 6 | 8 |
|---|---|---|---|---|---|---|---|---|
| Group/Team AVG | 58% | 36% | 43% | 79% | 91% | 51% | 31% | 77% |
| Steve Smith | 81% | 52% | 42% | 104% | 156% | 42% | 69% | 104% |
| Francis Walked | 60% | 55% | 36% | 151% | 10% | 44% | 4% | 118% |
| Susan Wong | 47% | 24% | 43% | 41% | 82% | 61% | 7% | 72% |
| John Dorosmith | 44% | 12% | 51% | 19% | 117% | 56% | 43% | 12% |
| George Washington | | | | | | | | |
| Thomas Jefferson | | | | | | | | |

◉ Easy Business Plan  ○ Comprehensive Business Plan
Your Plan is Private – Viewable only by you, your Managers, and Team Leaders

| | |
|---|---|
| Start Date for Plan Tracking: | 1/1/2013 ▼ |
| Total Length of My Plan: | 52 Weeks |
| # Actual Work Weeks: | 45 ▼ |
| Budgeted Time Off / Vacation / Training: | 7 Weeks |
| Estimate Below is Based on: | ○ 52  ◉ 52 Weeks |
| Total Budget Revenue – 52 Weeks: | $180000 |
| $ Avg. Income Earned from One Transaction: * | $ 6000 |
| Total # Transactions - # *Sales Closed* – 52 Weeks: | 30 |
| Pro-Rated Revenue Goal 52 Plan Weeks: | $180000 |
| Change My Current Revenue Goal: | $ 180000 |
| Current Revenue Goal – 52 Plan Weeks: | $180000 |
| Total Required # *Sales Closed*: | 30 |
| To Date Actual # *Sales Closed*: | 25 |
| To Date Remaining # *Sales Closed*: | 5 |
| Avg. # Units Sold – 45 Work Weeks Total – Per Week: | 0.67 |
| Avg. # Units Sold – 5.19 Work Weeks Left – Per Week: | 0.96 Updated: 11/24/2013 |
| Avg. # Units Sold – Today's Value – Per Work Week: | 0.96 Effective: 11/24/2013 |

○ Easy Business Plan  ● Comprehensive Business Plan
Your Plan is Private – Viewable only by you, your Managers, and Team Leaders

| | |
|---|---|
| Start Date for Plan Tracking: | 1/1/2013 ▼ |
| Total Length of My Plan: | 52 Weeks |
| # Actual Work Weeks: | 45 ▼ |
| Budgeted Time Off / Vacation / Training: | 7 Weeks |

| | |
|---|---|
| Budget Below is Based on: | ○ 52  ● 52 Weeks |
| Living Expenses: | $ 100000 |
| Business Expenses: | $ 30000 |
| Retirement / Investments: | $ 5000 |
| Taxes: | $ 30000 |
| Other / Misc. | $ 5000 |
| Total Expenses: | $170000 |
| Profit: | $ 10000 |
| Total Budget Revenue – 52 Weeks: * | $180000 |
| $ Avg. Income Earned from One Transaction: * | $ 6000 |
| Total # Transactions - # *Sales Closed* – 52 Weeks: | 30 |

| | |
|---|---|
| Pro-Rated Revenue Goal 52 Plan Weeks: | $180000 |
| Change My Current Revenue Goal: | $ 180000 |
| Current Revenue Goal – 52 Plan Weeks: | $180000 |

| | |
|---|---|
| Total Required # *Sales Closed*: | 30 |
| To Date Actual # *Sales Closed*: | 26 |
| To Date Remaining # *Sales Closed*: | 4 |
| Avg. # Units Sold – 45 Work Weeks Total – Per Week: | 0.67 |
| Avg. # Units Sold – 5.19 Work Weeks Left – Per Week: 0.96 Updated: 11/24/2013 | |
| Avg. # Units Sold – Today's Value – Per Work Week: 1.54  Effective: 12/9/2013 | |

(Save Updated Business Plan)   (Default Settings)   (Cancel Changes) v

Business Plan Still Needs to be Saved

FIG. 10B

My Productivity Score
AVG Efficiency Ratio: 81%  X AVG Activity: 101% = My Productivity Score: 82%
My Productivity Score: 82% X Target Income: $180,000 = Current Projected Income: $147,600

Update Your Weekly Goals
Auto-Reset Current Goals Every: [ 2 Weeks ]   Reset Now -- *Updates Weekly Goals so that both your*
My History: [Individual / Team / Group]          *AVG Efficiency Ratio and AVG Activity = 100%*
Starting:  09/01/2013         AVG Effiiency Ratio – History vs. Current:  81%
Ending:    11/17/2013         Based on My Recent History Period of:   [ 12 Weeks ]
Number of Weeks:  12

| My TO DOs | Current Weekly Goals | My History Weekly Goals | History vs. Current 81% | Change To My History or Back to Current Weekly All <<< |
|---|---|---|---|---|
| 1.) # 2-Way Contacts (Meet/Call/Write/Knocks) | 50 | 96.0 | 52% | <<< |
| 2.) # New Into Dbase | 10 | 24.0 | 42% | <<< |
| 3.) # Open Houses | 1 | 1.0 | 104% | <<< |
| 4.) # Buyer Appts. | 3 | 1.9 | 156% | <<< |
| 5.) # of Listing Appts. | 2 | 4.8 | 42% | <<< |
| 6.) # of Sales Opened | 1 | 1.4 | 69% | <<< |
| 7.) Outcome: # of Sales Closed | 0.96 | 0.96 | | |
| 8.) # of Sales Meetings | 1 | 1.0 | 104% | <<< |

| My TO DOs | Current Goals Conversion Ratios = 1 Outcome | My History Conversion Ratios = 1 Outcome | My History Cumulative Actuals (Date Range) | My History Manual Entry (OK to Edit) |
|---|---|---|---|---|
| 1.) # 2-Way Contacts (Meet/Call/Write/Knocks) | 52.08 | 100.0 | 200 | |
| 2.) # New Into dbase | 10.42 | 25.0 | 50 | |
| 3.) # Open Houses | 1.04 | 1.0 | 2 | |
| 4.) # Buyer Appts. | 2.00 | 2.0 | 4 | |
| 5.) # of Listing Appts. | 2.08 | 5.0 | 10 | |
| 6.) # of Sales Opened | 1.04 | 1.5 | 3 | |
| 7.) Outcome: # of Sales Closed | 1 | 1 | 2 | |
| 8.) # of Sales Meetings | 1.04 | 1.0 | 2 | |

*FIG. 10C*

GOAL TRACKING SYSTEM AND METHOD

CROSS-REFERENCE TO RELATED APPLICATIONS

This application claims priority to and benefit of U.S. Provisional Patent Application No. 61/737,056, filed on Dec. 13, 2012, entitled "GOAL TRACKING SYSTEM" by Steve Strickholm, and assigned to the assignee of the present application.

BACKGROUND

Tracking information can be an arduous task. Oftentimes, it is done manually, ad hoc and in an inconsistent basis. When attempting to manually enter the information in a database, the information may be entered incorrectly or not at all. Accordingly, the tracking of the information does not provide accurate and efficient results.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 2 depicts a goal tracking report, according to various embodiments.

FIG. 3A depicts a screenshot of an update screen, according to various embodiments.

FIG. 3B depicts a screenshot of an update screen, according to various embodiments.

FIG. 3C depicts a screenshot of an update screen, according to various embodiments.

FIG. 4A depicts a contact tracker, according to various embodiments.

FIG. 4B depicts a contact tracker, according to various embodiments.

FIG. 5 depicts a comment tracker, according to various embodiments.

FIG. 6A depicts a group tracker, according to various embodiments.

FIG. 6B depicts a time-series group tracker, according to various embodiments.

FIG. 7 depicts an individual tracker, according to various embodiments.

FIG. 8A depicts at least conversion ratios, according to various embodiments.

FIG. 8B depicts at least conversion ratios, according to various embodiments.

FIG. 9 depicts a productivity tracker, according to various embodiments.

FIG. 10A depicts a business plan, according to various embodiments.

FIG. 10B depicts a business plan, according to various embodiments.

FIG. 10C depicts a business plan, according to various embodiments.

DESCRIPTION OF EMBODIMENTS

Figure 1:
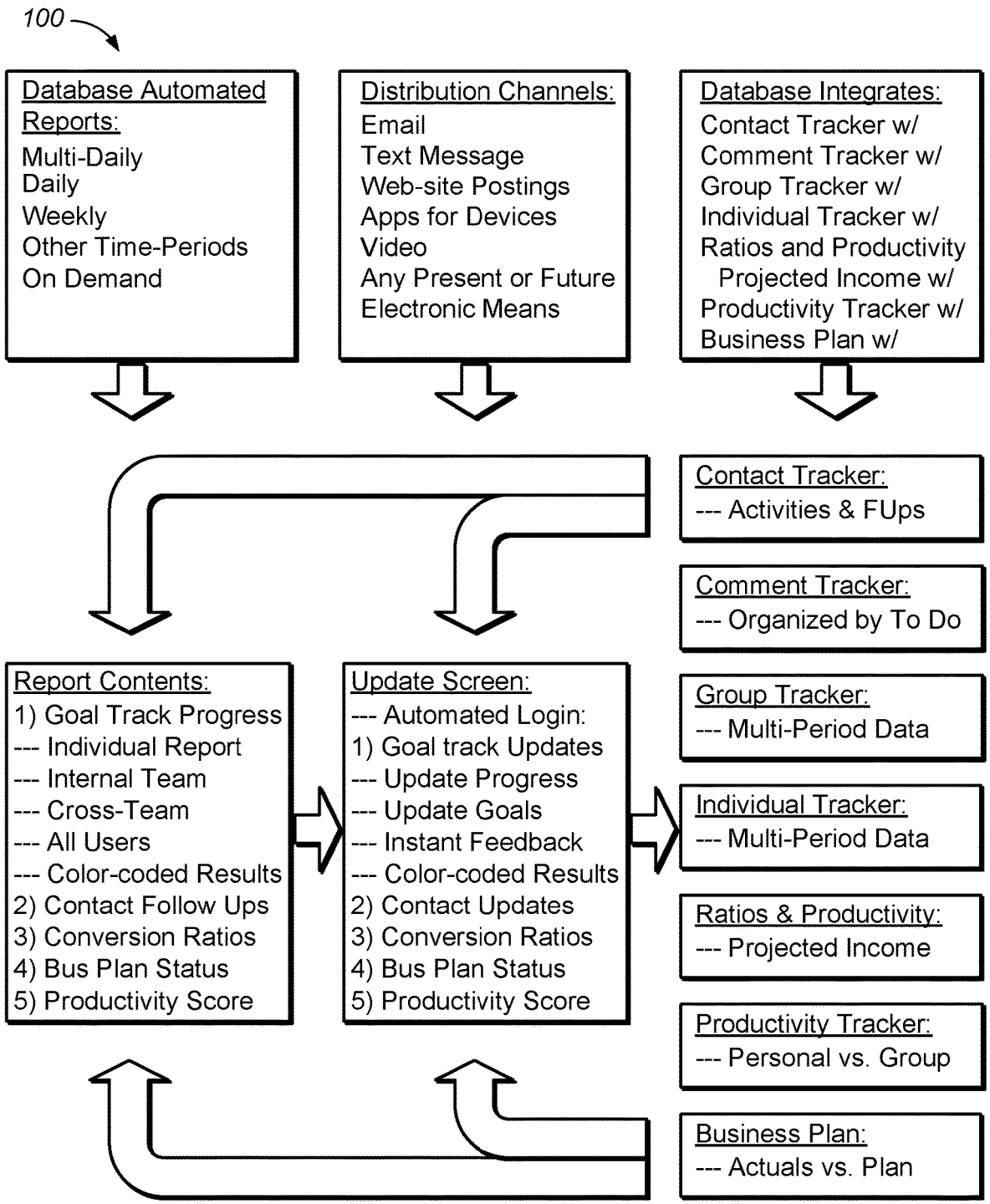
FIG. 1 depicts a block diagram of a process flow chart, according to various embodiments.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

FIG. 1 depicts an embodiment of a process flow chart 100 for a goal and contact tracking system. The goal and tracking system enables the tracking of various activities and associated contacts with such activities. As described herein, among other things, the system generates various trackers or templates that organize individuals into groups (including sub-groups) called teams. In one embodiment, an individual is not affiliated with a group or a team.

As depicted, there are three sections to the Goal Tracking and Integrated Contact Tracking System. The Regularly Scheduled or On-Demand, Database Automated Report, the Update Screen, and the Database Application with Integrated Reporting across all Goal Tracking and Contact Tracking systems.

The report can be activated or sent to Manager(s), Team Captain(s) and Individual User(s), Multi-Daily, Daily, Weekly, Other Time-Periods, On Demand etc.

It can be distributed through any electronic or otherwise Distribution channel, such as Email, Text Message, Web-site Postings, Apps for Devices, Video, and Any Present or Future Electronic Means The Automated Report can contain any or all of the following contents, as well as any of the other contents specified in various figures described herein, such as Goal Track Progress (e.g., Individual Report, Internal Team, Cross-Team, All Users), Contact Follow Ups, Conversion Ratios, Bus Plan Status, Productivity Score. Moreover, the reports may be Color-coded Results that allow the Users to quickly and easily identify status and trends.

The Update Screen can utilize an Automated Login procedure (or require a direct Login) embedded in the Database Automated Report. Any changes made to the Update Screen can be immediately transmitted to the Database Application and then immediately transmitted back to the Update screen to provide real-time analysis and reporting.

This Update Form can contain any or all of the following contents, as well as any of the other contents specified in figures described herein, such as, Goal Track Progress (e.g., Individual Report, Internal Team, Cross-Team, All Users, etc.), Contact Follow Ups, Conversion Ratios, Bus Plan Status, Productivity Score.

The update form can contain Color-coded Results that allow the Users to quickly and easily identify status and trends. The Update Screen can also be accessed within the Database Application as one of the available Application screens as well.

The Database Integration is enabled across Multiple Activity and Contact Tracking Systems. The Database Application continuously integrates and updates information supplied via the Update Screen, or by any of the other database screens or components, to the other Activity Tracking and Contact Tracking screens components as necessary. These database screens or components include but are not limited to the contents specified in various figures described herein. For example, Contact Tracker, Comment Tracker, Group Tracker, Individual Tracker, Ratios & Productivity Tracker and Projected Income, Productivity Tracker, Business Plan, etc.

The database application update screen can contain Color-coded Results that allow the Users to quickly and easily identify status and trends. The components of the Database Application Update Screen can also be accessed within the Update Screen as one of the available Update options as well.

It is noted that managers of the templates may have access to set the overall permissions of the templates, create and organize the groups, select/deselect members of teams and add/remove individual users from the overall system. They may also update goals and actuals for the groups, teams and/or individuals.

Additionally, team captains have access to the users in their team(s), and may have the ability to add/remove users from teams. They may also update goals and actuals for the teams and individuals, depending on their permissions.

Moreover, the individual users may have the ability to add/remove themselves from the goal tracking system. They may also update goals and actuals for their own individual account, depending on their permissions.

The system may be customized in various ways, as will be evidenced below. For example, various descriptions and categories (e.g., title/description of activities) may be customized by the user, captain, manager, etc. The period goal and actual numbers (e.g., current achievement for the time period) can be customized.

The Goal Tracking system can be applied to a wide range of areas of interest. These include but are not limited to, Real Estate Sales professionals (e.g., Agents, Title Reps, Mortgage Loan Officers), Financial Services professionals, Sales Teams in medium to large-size companies, Small Businesses and Independent Business Owners, Productivity Tracking for non-Sales personnel in companies, Health and Wellness Improvement, Sports and conditioning activities, Disability Rehabilitation for short term recovery (physical impairment, physical therapy recovery), Rehabilitation or Skill Training for long-term behavioral change, recovery and community integration (substance abuse, mental retardation, mental illness), etc.

It should be appreciated that the goal tracking system and method thereof is a fast, simple, easy-to-use Tracking system. It is able to push a regularly scheduled, automated Report to the User and Manager, with no effort on the part of the User or the Manager. An Update Screen using the automated Login procedure in the Report is able to be accessed from various devices. As a result, they don't have to remember a User ID, password or web address to Login.

The system and method allows users to quickly and easily Update their Activity and/or Contact information with a few quick keystrokes, voice commands, or taps on their Tablet or Smartphone, and have that information immediately transmitted to the database application; update all the integrated database components, and then immediate re-transmit back to the Update Screen providing Real-time reporting and Status updates.

From Start (Viewing the Automated Report) to Accessing/Adding Information via the Update Screen, to Finish (Viewing the new, re-transmitted Updated Report), this process can now be done in less than 30 seconds. In addition, the information capture can include Activity Updates, Contact Updates, or both. Therefore we can simultaneously capture the Data associated with both the Activity and the Contact.

The integrated database application can then calculate many critical but hidden variables which are important to success in the Manager or User's chosen field. These include but are not limited to the various features and reports shown in various figures described herein.

FIG. 2 depicts an embodiment of a goal tracking report 200. Report 200 is generated based on various goal tracking information, as described herein. Report 200 may be generated automatically at various pre-determined time periods.

Report 200 depicts real-time information, such as, but not limited to, progress towards attaining a goal of an individual, team, and/or group. Additionally, report 200 may be color coded, as described in further detail below.

Report 200 includes portion 210. Portion 210 includes various information of the goal tracking system. Portion 210 is similar to portion 310, as described below. In various embodiments, portion 210 may include, but is not limited to, links for quick and easy access to the following options: group discussion, comment tracker, mobile/standard view, contact tracker, Login, training, contact leader, new contact.

Portion 212 depicts My Contact Tracker information. In general, this portion depicts upcoming and overdue activities and associated contacts.

In various embodiments, information in portion 212 includes status of the activity and associated contact, contact name, date/time of activity, description of activity, etc.

A user may be directed to the Contact Tracker (see FIG. 4A) in response to selecting a contact's name. The user is then able to access the functionality of the Contact Tracker, as described herein. Additionally, any or all information shown/entered in report 200 transfers to and/or is available in the Contact Tracker.

Portion 214 depicts conversion ratios. In general, portion 214 shows key activity conversion ratios for a user, and monetizes the value of that key activity for the user. In one example, a primary input goal (e.g., 2-way contacts) and a primary output goal (e.g., sales closed) are depicted. The conversion ratio of portion 214 is the conversion ratio of portion 342, as described herein.

Portion 216 depicts an embodiment of a business plan. In one embodiment, the information in this section shows the primary factors for the user's business plan. The information can be, but is not limited to, activation status, number of planned weeks of production for a time period (e.g., year), goal values (e.g., sales closed, total number of target transactions, annual revenue), and income goal. The business plan of portion 216 correlates the business plan of portion 344.

Portion 218 depicts an embodiment of a productivity score. In one embodiment, the productivity score combines two calculations, (1) the average efficiency ratio, and (2) the average activity score. When multiplied together, they determine the hidden productivity score, which then can be used to calculate the projected income for the user. The productivity score of portion 218 correlates the productivity score of 346.

Portion 220 depicts a "scoreboard." The scoreboard can include, but is not limited to, user's name, name of tracker (or template), name of leader/manager/coach, frequency of automated reports, user's current status for their progress in the current period, user's current rank among current participants, period deadline date and time.

In one embodiment, the user's current status is calculated by taking the overall average of all the active categories' percent progress (e.g., 24%). This information is also available in other screenshots, for example, at least as depicted in FIGS. 3A-C, 5, 6A-B and 7.

Portion 222 depicts a list of user activities associated with a time period. Portion 222 correlates with portion 320 of FIG. 3A. The user activities may be listed in a "To Do" list. For example, as depicted, the user activities may include, trainings attended, script practice/role play, contacting, doors knocked on, 1-way contacts (e.g., dials, emails), 2-way contacts (e.g., voice-to-voice). It should be appreciated that any user activity that is desired to be tracked may be listed.

Various portions of report 200 correlate to other screens and portions of the tracking system. For example, portion 222 correlates with information depicted at least on FIG. 5.

Report 200 may also include My Goal Tracker, as depicted in FIG. 3C. For example, My Goal Tracker includes portions 350, 352 and 354, which are described in further detail herein.

FIGS. 3A-C depicts an embodiment of a screenshot 300 of a user interface for the goal and contact tracking system. Screenshot 300 includes various portions that facilitate in goal tracking and contact tracking, which will be described in further detail below. Screenshot 300 can be described as a depiction of an embodiment of a Goal Tracker and Integrated Contact Tracker Update Screen, or "goal tracker update screen."

The goal tracker update screen allows for, among other things:

(1) Updating user's actual activity on a regular basis (e.g., daily). The tracking can be accomplished by updating all the numbers at once or by updating a category and simultaneously capturing and sharing pertinent information.

(2) Adding new contacts and interacting with existing contacts. Users, for example, can enter information, set follow up activities, dates, etc.

(3) Investigate and review in real-time information such as, progress of themselves, their team and/or an entire group.

Now referring to at least FIG. 3A, portion 310 includes links (or "quick links") to various options of the goal and contact tracking system. Portion 310 may include, but is not limited to, links for quick and easy access to the following options: group discussion, comment tracker, mobile/standard view, contact tracker, Login, training and support, contact leader, new contact.

For example, a user may wish to make comments to the group discussion. As such, the user selects the group discussion link and then will be directed to start a group discussion.

In various embodiments, at least some of the links require going through a login procedure. The comments in the group discussion may be confidential. Therefore, a user is required to login to access the group discussion. The login may require a user name and password, in some embodiments.

The login in procedure may be activated from a report, for example, a report, as depicted in FIG. 2. The login may occur from any distribution channel, as described in FIG. 1.

It should be appreciated that any number of links may be depicted in portion 310.

Portion 312 allows for entering of information associated with various time periods. For example, a user may select to enter user activities during, but not limited to, the current week, last week, two weeks ago, etc.

It should be appreciated that the selecting of the time period for entering user activities may be accomplished without requiring the user to log into the full website using the automated login procedure.

In one embodiment, portion 312 is optional.

Portion 320 depicts a list of user activities associated with a time period (e.g., a selected time period of portion 312).

The user activities may be listed in a "To Do" list. For example, as depicted, the user activities may include, trainings attended, script practice/role play, contacting, doors knocked on, 1-way contacts (e.g., dials, emails), 2-way contacts (e.g., voice-to-voice). It should be appreciated that any user activity that is desired to be tracked may be listed.

The listed user activities may be associated with various goal tracking features such as, but not limited to, comments, goal indicators, actually accomplished indicators, status, etc.

For example, the activity of "# of Trainings Attended WK" has a goal of 1. The user may enter the number of actual trainings attended during the week in the "Actual" column. The user may select the "save changes" button in portion 312 to save any changes (e.g., actual accomplishments of user activities) provided in portion 320.

Depending on the user's permissions, the goals for the To Dos can be changed by the user, manager, or team captain.

Additionally, a user may add more info associated with trainings attended by selecting the "More Info" button 322, which will be described in further detail below.

Each of the listed activities is associated with status 324. In one embodiment, status 324 is a list of the percentage of accomplishment of the listed activities. For example, if a goal of doors knocked on is 80, and the user has currently knocked on 49 doors, then the status for doors knocked on is 61%.

Status 324 may also include visual indicators to facilitate in viewing the status of the listed activities. For example, the status of a listed activity may be, but is not limited to, (1) shaded blue when a user has accomplished more than 150% of the goal, (2) shaded dark green when the user is at 100% to 149% of the goal, (3) shaded light green when the user is at 50% to 99% of the goal, (4) shaded yellow when the user has accomplished less than 50% of the goal, (5) and shaded red when the user has accomplished 0% to 5% of the goal.

It should be appreciated that the visual indicators may include various shading, colors, cross hatching, etc. Additionally, visual indicators, such as the shading described above, may be implemented in various embodiments as described herein. For example, shading may be implemented to highlight the status of various activities.

In one embodiment, various parameters are reset at the end of the time period. For example, the actual accomplishments of the list of activities and the status of the activities are reset to zero at the end of the indicated time period with no effort on the part of the manger, team captain, or user.

In some embodiments, portion 320 is customizable. For example, the activities, the time period, category titles, descriptions, permissions, etc. are customizable by one or more users (e.g., individual user, manager, team captain, etc.) based on permissions of the users.

In various embodiments, some or all information displayed and/or entered in at least portion 320 of screenshot 300 may be displayed in other portions of other displayed information. For example, information in portion 320 is also displayed in the Group Tracker Multi-Period Data, as depicted in FIG. 6A. Additionally, some or all information provided in the Group Tracker may be transferred and displayed in at least portion 320 of screenshot 300.

In another example, information in portion 320 is also displayed in the Individual Tracker Multi-Period Data, as depicted in FIG. 7. Additionally, some or all information provided in the Individual Tracker may be transferred and displayed in portion 320 and/or in the tracker of FIG. 5.

As described above, additional info associated with a listed activity may be provided. For example, a user selects a "More Info" button (e.g., button 322) and one or more of portions 330, 332, 334, 336, and 338 are displayed. As such, portions 330, 332, 334, and 338, in combination, may also be described as the More Info portion.

Portion 330 allows for changes to actual activities accomplished. For example, a user selecting button 322 associated with trainings attended may increment the amount of actual meetings attended in portion 320 via portion 330. It is noted that more than one current activity category may be updated as an additional secondary activity in this portion.

Portion 332 depicts a contact associated with a selected activity. For example, a user may have met a particular person during a meeting that the user attended. The user may then add the contact information in portion 332. Contact information may include, but is not limited to, name, office phone, company name, email, mobile phone, class (e.g., prospect), priority, etc.

Portion 334 depicts follow up activity associated with the contact in portion 332. For example, the user will input follow up activities such as, but not limited to type of contact (e.g., 1-way, 2-way, etc.) date, time, reminder, etc. In one embodiment, information provided in portion 334 is a new activity for the user. Such activity may then be listed in portion 320. Additionally, more than one follow up activity category can be inputted as an additional follow up activity in this portion.

Portion 336 depicts comments associated with a contact. For example, a user may provide any comments to document an activity or any information associated with a listed activity or contact. Additionally, the comment can be associated with each of the captured current activities. The comment will then be available in the comment tracker of FIG. 5 and other locations (e.g., FIG. 4A).

Portion 338 allows for sending of alerts. For example, portion 338 allows a user to define whether or not to send alerts (e.g., email alerts, texts, etc.) about the added information. The alerts may be sent to various individuals such as, but not limited to, managers, coaches, team captains, etc. The alerts may be used by various individual to reply back to the user. Such reply comments by the individuals and/or user are captured for future reference, for example, in comment tracker of FIG. 5.

The "show" function allows users to view and select which individuals are included in the alert (e.g., managers, coaches, team captains, etc.).

Once the additional information is provided, a user may save and close one or more of portions 330, 332, 334, 336, and 338 or may save and add any other additional information.

In various embodiments, some or all information displayed and/or entered in the More Info portion may be displayed in other portions of other displayed information (e.g., screenshots). For example, information in the More Info portion is also displayed in the Contact Tracker: Activities and Follow Ups, as depicted in FIG. 4A. Additionally, some or all information provided in the Contact Tracker may be transferred and displayed in screenshot 300, such as the More Info portion.

In another example, comments provided in portion 336 may be available as data depicted in at least FIG. 5.

Now referring to at least FIG. 3B, portion 340 depicts various user activities (e.g., 2-way contact, 1-way contact, open house, etc.) associated with at least a status (e.g., overdue, due today, due this week, etc.). For example, activities that are overdue are listed in an "overdue" portion. Activities that are due immediately are listed in a "today" portion, and activities that are due during a particular time period (e.g., this week) are listed under that particular time period.

Additionally, contacts associated with the user activity are also listed. In one embodiment, a user is able to select the contacts. In response to selecting a contact, a user is directed to a full contact section displaying full contact information of the selected contact including the ability to add information or activities to the contact.

In various embodiments, a user can complete activities and/or update contact information via portion 340.

Portion 342 depicts conversion ratios. In general, portion 342 shows key activity conversion ratios for a user, and monetizes the value of that key activity for the user. In one example, a primary input goal (e.g., 2-way contacts) and a primary output goal (e.g., sales closed) are depicted. It is noted that the conversion rations and monetization can depict the user's overall team(s) and/or group(s).

An average number of primary input goals that a user needs are shown (e.g., 100) equal to the number of user activities (e.g., 100 2-way contacts) in order to result in a primary output goal (e.g., sales closed). In one embodiment, the calculation is based off of data provided by a user.

Additionally, the average revenue for one primary goal is provided (e.g., 1 sale is $6000). Accordingly, the system is able to calculate the average value of a user activity (e.g., each 2-way contact is $60 ($6000/100=$60)).

As a result of displaying the monetization of each user activity, a user will see what each actual accomplishment of user activities is worth and will then be motivated to accomplish such activities.

Portion 344 depicts an embodiment of a business plan. In one embodiment, the information in this section shows the primary factors for the user's business plan. The information can be, but is not limited to, activation status, number of planned weeks of production for a time period (e.g., year), goal values (e.g., sales closed, total number of target transactions, annual revenue), and income goal.

In one embodiment, the income goal is based on the income goal depicted in at least FIG. 10A. The income goal may be calculated by multiplying a goal (e.g., total number of transactions) by the average income earned from one transaction (e.g., $6000, with a result of $180,000). The income goal time period can be set for any length of time.

Portion 346 depicts an embodiment of a productivity score. In one embodiment, the productivity score combines two calculations, (1) the average efficiency ratio, and (2) the average activity score. When multiplied together, they determine the hidden productivity score, which then can be used to calculate the projected income for the user.

The average efficiency ratio may be obtained from various parts of the tracking system. For example, the average efficiency ratio may be obtained from the calculations depicted in conversion ratios, productivity score and projected income, as depicted in FIG. 8B (e.g., right side column), or from FIG. 9 depicting a Productivity Tracker: Efficiency Ratios and Activity (e.g., a specific user row).

Regarding the average efficiency ratio, it should be appreciated that any time period may be chosen from which to calculate the actual historical ratio (e.g., 12 weeks). The actual historical ratio is the averaged ratio between the user's actual historical conversion or efficiency ratio vs. the current goal conversion or efficiency ratio, for each category, for the selected time period. The conversion/efficiency ratios for each category are then averaged together to compute the overall average efficiency ratio, for the entire time period (e.g., 81%).

The average activity score may be obtained from various parts of the tracking system. For example, the average activity score may be obtained from the Individual Tracker: Multi-Period Data, as depicted in FIG. 7.

Any time period can be chosen to calculate the average activity score (e.g., 4 weeks in FIG. 7). The average percent progress score for each time section is determined by averaging the percent progress score across all individual categories (e.g., per week). The average percent progress score for each time section may then be averaged together to determine the overall average activity score, for the entire time period (e.g., 101%).

The productivity score calculation may be obtained from FIG. 8B. For example, the average efficiency ratio is multiplied by the average activity score to produce the productivity score (e.g., 81%×101%=82%).

The current projected income may also be obtained from FIG. 8B. For example, the target income used in the calculation is computed by multiplying the Goal-total number of target transactions (e.g., 30) by the average outcome value (e.g., $6000). The target income time period can be set to any time period (e.g., 1 year with 30 transactions at $6000 per transaction).

The target income is the result the user would accomplish for this time period based on both 100% average efficiency and 100% average activity (e.g., $180,000). The productivity score is then multiplied by the target income to produce the current projected income (e.g., 82%×$180,000=$147,600). The current projected income shows the projected income the user will produce if (1) the user's current productivity score, (2) goal-total number of target transactions, and (3) average outcome value remain constant over the target income time period.

Now referring to FIG. 3C, "My Goal Tracker" is depicted. FIG. 3C includes portions 350, 352 and 354. This information can be configured such that users can see none, all or any combination of the rankings reports. The manager may have visibility to all the information.

Portion 350 depicts the rankings of users in a team. For example, "Team Achieve" includes five individuals. The individual performances are ranked. Portion 350 may include the current value for the team members' primary input goal and/or output goal, and the current average progress for each team members' total goals.

Portion 352 depicts the cross-team rankings. For example, the rankings of various teams are depicted. This ranking may be based on the average of all team members on the team. Portion 352 may also include team name, team ranking within the goal tracker, current actual total for the team's primary input and/or output goal, and the current average progress for each team based on the average progress of all team members.

Portion 354 depicts user rankings from various teams or groups. The rankings may include the current rank of each user based on the average of all their goals, the number of categories (e.g., to do's) that the user has assigned, how many updates the user has made in the current period, and the current average of all goals for each user.

FIG. 4A depicts an embodiment of a screenshot of Contact Tracker: Activities and Follow Ups 400, also referred to as "contact tracker." The contact tracker screen allows users to update and view contact information; update and view current and future activities, and view historic data. This screen also presents a table showing filter data for contacts.

Regarding the contact tracker, users can create a new contact at any time by selecting Add New Contact. The filter section allows users to filter the information display value including but not limited to Priority, Follow Up Date, Next, Last, Office, Company, Next Follow Up, Remind Me, First Initial, Last Initial, Class, Referred By, Status, etc.

The Search Name field allows users to begin typing a contact's name and the display list will present any and all contacts that match the text in the search field. The columns of the information table are sortable by selecting the column name. The columns of the information table are customizable to show the fields and order desired by the user.

Each row is expandable to show all contact information by selecting the row. This information includes by is not limited to:

Current Activity—The current activity field allows user to select a To Do that they may want to update that corresponds to the selected contact.

Additional Current Activities—The user can select one of more Current Activities to capture in the database.

Actuals to Add—This field will add the select amount to the current actual for the To Do.

Visual of how the new actual will update progress for the current activity. In this example an actual to add of 1, updates the current actual from 12 to 13 which will result in a new percent progress to 33%.

Contact Info—This section shows the primary contact fields for a contact including but not limited to mobile, business, and home phone numbers. There are also quick links to allow users to initiate a new email, text, or phone call to the contact. The View All link expands this section to show all contact information for the selection.

Next Follow Up—The next follow up allows users to define the next time they need to interact with this client.

The user can select the action from the list of To Dos for the tracker, or they can select other. The user can define the priority of the follow up action. The user can define the status of the action which can include but is not limited to Active, Inactive, or Delete. The user can define the date for the action. The user can define the time for the action.

Another alternative for defining the action follow up date is using the Remind Me selection. In this option, you can define how many days or weeks between actions with the contact. This effectively creates a recurring action plan. The user can define the class of the action which can include but is not limited to client, rep., etc.

Additional Follow UP Activities—The user can select one or more Follow Up Activities to capture in the database.

The Comment section is where users will document the content of the activity with any information that they would like to track. Also, the comment may be associated with each of the captured current activities, as described above. The comments will then be available in the comment tracker of FIG. 5 and other locations.

Send Alerts allows users to define whether or not to send email alerts about this section to mangers/coaches and/or team captains. The Show function lets users view and select which individuals to include in the email alert. Note: There is an administrative function which can force email alerts if so desired.

Save and Close/Cancel—Allows the user to save or cancel the changes made to the contact.

Comments—This section shows historic Comments and/or updates data for quick reference. Users can filter data to view Comment, Status Changes, or All. Comments/Updates are stamped with the name of the contributor. Comments/Updates are time and date stamped.

In various embodiments, information in the comment tracker is transferred from FIG. 3A-C: Goal Tracker and Integrated Contact Tracker Update Screen: Automated Login or FIG. 5: Comment Tracker.

Any and all information entered here in FIG. 4A transfers into and can be available as data, as depicted in various other figures.

FIG. 4B depicts contact tracker screen on a mobile device. Any and all of the features and functions described above for the Standard View FIG. 4A can also be applied and activated for the Mobile View of the Contact Tracker, with a sample shown in FIG. 4B.

The Goal Tracker database can determine the nature of the User device when the User either: Accesses the Goal Tracker system via the Automated Report and Automated Login, or Via Direct Login by the User to the application.

The Goal Tracker can then present either the Standard View or the Mobile View, depending on the nature of the User device and/or screen resolution of the User device.

The result is not only an Automated Login, but also an Auto-Detection of the User device type and Auto-Loading of the most optimal Data Review and Update Interface for the User.

FIG. 5 depicts an embodiment of a screenshot of a Comment Tracker 500.

The Comment Tracker allows users to add and review information about each of the activities or To Dos in the contact tracker. In one embodiment, the data is color coded, as described above.

Users can select various time periods that they wish to view. Users can also view all data if so desired.

A user can use the quick link to view and update their activities, for example, in the Update To Dos Screen. Users may also filter data to view comments, status changes or all.

Data in the contact tracker can be updated in the instant screen or on the Update Screen of FIGS. 3A-C.

Comment tracker 500 may include a linked title for each activity (e.g., linked title 510). Selecting the linked title shows the comment and update data based on the filters. Additional information may include the user who entered the data, comment, status changes, time/date stamps, etc.

A user may desire to add new information. For example, a user may select the "New Post" or "More Info" button and enter additional information. In one embodiment, in response to selecting the "New Post" button, the More Info portion (i.e., portions 330, 332, 334, 336, and 338), as described above is displayed. As such, a user is able to enter any appropriate information associated with the More Info portion.

In various embodiments, some or all information displayed and/or entered in the Comment Tracker may be displayed in other portions of other displayed information (e.g., screenshots). For example, information in the Comment Tracker is also displayed in the Contact Tracker, as depicted in FIG. 4a. Additionally, some or all information provided in the Contact Tracker may be transferred and displayed in Comment Tracker.

FIG. 6A depicts an embodiment of a screenshot of a Group Tracker 600. The Group Tracker allows users to view numerical data for the group, team, and/or individuals. The Group Tracker can include, but is not limited to, actual, goals, percent progress, etc. Additional information can include individual To Do values as well as average and total values.

Visibility into other users' data may be controlled by the tracker manager.

The Group Tracker includes a recurring template option. This option allows the user to select the desired tracker to view (e.g., Agent Business Development). This is beneficial because various users may be involved in multiple trackers or templates.

The Group Tracker also includes various filters to filter which data is viewable.

Such filters includes, but are not limited to:

(1) Start and end date filter—This allows the user to select the time period of the data that is viewed.

(2) Team filter—This allows a user to view only users belonging to the selected team.

(3) Primary and secondary filters—This allows users to view data for tracker members by various filters (e.g., coach, manager, office, department, etc.)

(4) Select action—This allows the user quick links to other screens and/or actions (e.g., Update To Dos screen, Send To Do Update Action (see FIG. 2), Manage Template Screen, Start New Action, Edit Group Action, Edit Team Action, etc.)

(5) Template status—This provides a default to Active templates. However, users can view deactivated templates in order to review historic data.

It is noted that a color legend bar may also be included in the Group Tracker, as well as any other template or screen.

The Group Tracker may also include various selections or tabs such as Group Snap Shots and Group Time Series.

The Group Snap Shot selection includes various features. FIG. 6B depicts the selection of the Group Snap Shot. The View selection allows users to select whether they want to see actuals (default), goals, or percent complete.

The "Show All|Stars Only" selection allows users to view all user or "starred users". Starred users are the users that improved from 2 periods to 1 period ago.

The Users link lets the user sort the user list alphabetically. The default is to sort from highest to lowest average percent complete.

Viewers can choose whether to show the Current Period, Last Period, or Cumulative results. The Cumulative results use the Start and End date filters to select the cumulative period.

Selecting on a user's name redirects to that user's Update To Do Screen.

Hovering over the column numbers displays the title of the corresponding To Do.

The "star" column indicates users who have increased their overall percent complete from 2 periods ago to the most recently completed 1 period ago. This can also be used to calculate and indicate an overall percent increase between ANY two comparative Time Periods of ANY length.

The % Avg column shows the Total Average of All User's To Do percent complete. The first entry (Group AVG) in the column is the percent average of all the users' percent averages.

Each numbered column corresponds to an individual To Do. Hovering over this number displays the name of the To Do.

The first row of the numbered columns shows the average percent complete for all users in the list for that To Do.

The last row of the number columns shows the cumulative actual amount for that To Do for all users in the list.

The numbers in the number columns (excluding the first and last rows) shows the Actuals, Goals, or percent complete for each user for each To Do.

FIG. 6B depicts an embodiment of a selection of the Group Time-Series 600. The group time-series selection includes various features.

The View selection allows users to select whether they want to see actuals (default), goals, or percent complete.

This option can only be set to Percentages if "Average of All To Dos" is selected for viewing.

The second View selection allows users whether to view all To Dos or a specific To Do.

The Users link lets the user sort the user list alphabetically. The default is to sort from highest to lowest percent average for all To Dos or a specific To Do.

The first row of the first column of data shows the percent average of all users' percent averages for all time periods shown. The time periods may be any selected time period allowed by the application (e.g., days, weeks, months or any recurring time period).

All the first row data, except the first column, shows the average of all users' percent averages for that column's specific time period.

The % Avg column, except the first row, shows the average of the percent averages for all of the time periods shown for each user.

The last row of the table shows the cumulative Actual Totals for all users for the column's time period. The exception is when the user is viewing "Average of All To Dos".

The remaining data includes data columns 2 through y and rows 2 though x–1, where y is the number of columns and x is the number of rows in the table. This data shows the Actuals, Goals, or Percentages for each user for the selected To Do or All To Dos for the designated time periods.

FIG. 7 depicts an embodiment of a screenshot of an Individual Tracker 700. The individual tracker (or My Scoreboard) is a convenient viewing collection of data for an individual user. This data can be reviewed by the manager/coach, team captain, or user. This data can be viewed in weekly or monthly segments. It is noted that data is color coded to make this examination quick and interesting. The time periods may be any selected time period allowed by the application (e.g., days, weeks, months or any recurring time period).

Regarding the Individual Tracker if the user has access to multiple users' data, the user can select the desired person's name. For informational purposes, the individual user's permission or whether or not he can edit his own goals is shown.

The user can select whether to view segments in a Weekly View or Monthly View. The scroll bar allows users to scroll back in time to the beginning of the tracker. The To Do titles are listed in order in the first column of the table. The time periods may be any selected time period allowed by the application (e.g., days, weeks, months or any recurring time period).

Each segment of the results in the table consists of groupings of 4 columns. These columns consist of the Actual, Goal, Gap (=(Goal–Actual)), and Percent Complete (=(Actual/Goal)). Each row shows these values for each To Do.

The average percent complete for all To Dos is shown for each segment of data. The average percent complete for each Specific To Do can also be shown for the entire viewed Time Period, or any desired Time Period.

The average of the ALL the period average percent completed can be calculated and shown for the entire viewed Time Period, or Any desired Time Period This data may be attained from the entries, as depicted in FIGS. 3A-C: Goal Tracker and Integrated Contact Tracker Update Screen: Automated Login and/or FIG. 5: Comment Tracker.

Now referring to FIGS. 8A and 8B. The Comprehensive Conversion Ratio Tracker in FIG. 8A shows possible pairings of the TO DOs, which are then used to build both the Standard and Custom Views in FIG. 8B. The Standard/Custom Conversion Ratios: Productivity and Projected Income Tracker allows users to review information about each of their Conversion or Efficiency Rations for each of their TO DOs and overall Productivity and forward-looking Results (Projected Income) that Productivity will create at their current level of Activity.

There are two Analyses of the Conversion Ratio Data: Comprehensive and Standard/Custom View. These have the following features in common (including but not limited to the below):

Groups/Teams/User: The Manager, Team Captain or User (depending on permissions) can choose one of these three options for data review: One or more entire Groups, One or more Specific Teams, and A Specific User Time Period: The Manager, Team Captain or User (depending on permissions) can select the week, month, or year, or Any Time Period for the data they wish to view. They can also view all data since the start of their tracker.

Regarding FIG. 8A, this analysis of the data shows possible pairing of TO DO Categories, and the Conversion Ratio between them.

A Matrix is created that analyzes every TO DO against every other TO DO.

The Order of the TO DOs should represent the Temporal or Causal Order of the Activities. Earlier TO DOs should generally be Pre-cursors to Later Outcome TO DOs.

In this case for example, TO DO 1: # 2-Way Contacts comes before TO DO 7: # Sales Closed, because Contacting and setting up Appointments generally occurs before the User can Close a Sale.

In the case of Health and Wellness, # Days of Exercising, or # Days of Healthy Eating, would come before # Pounds Lost, as these sorts of activities generally occur before the User can lose weight.

The Conversion Ratios are determined by using the Comprehensive Activity Numbers for each TO DO captured in the first Column to the Right of the TO DO Titles at the beginning of the Rows in the Matrix.

These Comprehensive Activity Numbers are calculated as the Total Number of Activities for the Groups/Teams/User and over the Time Period as specified in the top part of this section.

The Conversion Ratios are calculated as the Ratio between these two Numbers for the chosen PAIR of TO DOs.

Example: TO DO 1: # 2-Way Contacts vs. TO DO 7: # Sales Closed. The Value of 23,003.5 is Divided by: 306.0 (ex. 23,003.5/306.0=75.2). The Result: 75.2–2 Way Contacts will produce 1–Sale Closed.

Note that the top half of the Matrix is blank, because these numbers are simply inverse calculations of the numbers in the bottom half. Also, each TO DO cannot be compared against itself (which is a 1 to 1 relationship), so this comparison is blank as well.

The Number at the Top of each Column identifies each TO DO which corresponds with the identifying Number for each TO DO at the beginning of the Row in the Matrix. It is noted that hovering over the column number displays the To Do title.

The Conversion Ratios for possible PAIRING of TO DO Categories, can be read as follows:

When you read across a ROW, it tells you how many ACTIVITIES in each of the COLUMNS are required to give you ONE ACTIVITY RESULT for that ROW.

Example: For Row 7: # Sales Closed vs. Column 5: # Listing Appts. Result: 2.4–Listing Appts will produce 1–Sale Closed.

When you read down a COLUMN, it tells you how many ACTIVITIES in THAT COLUMN are required to give you ONE ACTIVITY RESULT for each of the ROWS.

Example: For Column 1: # 2-Way Contacts vs. Row 7: # Sales Closed. Result: 75.2–2 Way Contacts will produce 1–Sale Closed.

Estimate of Future Success: The longer the period of time of data capture, and the more accurate the data, the more the Comprehensive Conversion Ratio Tracker can be used to provide an estimate of the Amount of Activity in a Precursor TO DO needed by the Group, Team or User to produce a Result with an Outcome TO DOs.

FIG. 8B depicts an embodiment of a screenshot of at least conversion ratios, productivity scores and projected income tracker 800. The Ratios, Productivity and Projected Income Tracker allows users to review information about each of their Conversion or Efficiency Rations for each of their TO DOs and overall Productivity and forward-looking Results (Projected Income) that Productivity will create at their current level of Activity.

It is noted that data may be color coded to make this examination quick and interesting.

The following description provides various examples of tracker 800.

The Manager, Team Captain or User (depending on permissions) can choose one of these three options for data review: One or more entire Groups, One or more Specific Teams, and a Specific User.

The Manager, Team Captain or User (depending on permissions) can select the week, month, or year, or Any Time Period for the data they wish to view. They can also view all data since the start of their tracker.

There are two Views of the User Data. The Standard View (shown below), takes each of the TO DO Categories that are not the Primary Outcome Goal, and calculates their Efficiency Ratio against the Primary Outcome Goal.

The Custom View (not shown), allows the Manager, Team Captain or User (depending on permissions) to create a version of this Tracker that pairs any TO DO Category against any other to calculate each of their specific Efficiency Ratios. Many such customized pairs would then constitute the Report below.

The various columns of the report of FIG. 8B are calculated as follows:

No.: Numbers the Pairs in sequential order.

Input vs. Outcome TO DOs: Describes the Standard or Customized Pairs as described above.

Cumulative History—Actuals: For each Pair: The Selected Group(s), Team(s) or Individual, the Total Number of Cumulative Activities for that TO DO Category tallied during the chosen Time Period.

Existing Weekly Goals: For each Pair: The CURRENT Goals for the Current Goal Cycle (shown as Weekly here, but can be Daily, Monthly or any other periodic Cycle). These would be the Average Period Goals for the Group(s) or Team(s), or the specific Individual Goals for a User.

Efficiency Ratio—Actuals: For each Pair: The Ratio of the Cumulative History Actuals between the Input vs. Outcome TO DOs.

Efficiency Ratio—Goals: For each Pair: The Ratio of the Existing Weekly Goals between the Input vs. Outcome TO DOs.

% Return—Actuals: For each Pair: The Inverse of the Ratio of the Cumulative History Actuals between the Input vs. Outcome TO DOs. Described here as a Percentage.

% Return—Goals: For each Pair: The Inverse of the Ratio of the Existing Weekly Goals between the Input vs. Outcome TO DOs. Described here as a Percentage.

Actuals vs. Goals—% Ratio: For each Pair: The Percentage of the Efficiency Ratio–Goals vs. the % Return–Actuals.

For One Input TO DO—$ Return: For each Pair: The Value of each Input TO DO can be expressed as an economic value. This is determined by using the figure for the Group(s), Team(s) or User's: Avg. Outcome Value, which is the Avg. economic value of One (1) Outcome TO DO.

The Avg. Outcome Value can be set by the Manager, Team Captain or User (depending on permissions). It is noted that this value also be taken from FIG. 10A.

The Avg. Outcome Value is then divided by the Efficiency Ratio–Actuals described in Efficiency Ratio–Actual.

This Financial number shows the economic value to the Group(s), Team(s) or User of engaging in One (1) Input To Do, based upon their Cumulative History–Actuals described in Cumulative History-Actuals.

The My Productivity Score, depicted in FIGS. 8A-B, is the same as the My Productivity Score described in relation to FIGS. 3A-C.

FIG. 9 depicts an embodiment of productivity tracker: Efficiency ratios and activity–Individuals vs. Team/Group AVG tracker 900. The Productivity Tracker: Efficiency Ratios & Activity—Individuals vs. Team/Group AVG Tracker allows users to be compared against others, regarding the Conversion or Efficiency Rations for each of their TO DOs and overall Productivity and forward-looking Results (Projected Income) that Productivity will create at their current level of Activity.

Also, it allows the Manager, Team Captain or User (depending on permissions) to compare each Individual against other Individuals in a Team or Group (as in example below), as well as comparing Teams against other Teams, and/or Groups against other Groups.

It is noted that data is color coded to make this examination quick and interesting.

Details of Productivity Tracker: Efficiency Ratios & Activity—Individuals vs. Team/Group AVG Tracker:

Groups/Teams/User: The Manager, Team Captain or User (depending on permissions) can choose one of these three options for data review: Individual against other Individuals in a Team or Group (as in example below), Teams against other Teams, and Groups against other Groups.

Time Period: The Manager, Team Captain or User (depending on permissions) can select the week, month, or year, or Any Time Period for the data they wish to view. They can also view all data since the start of their tracker.

Column Identifiers: The PAIRED TO DO Categories shown in the subsequent Columns, are referred to via the numerical Identifiers as shown in the First Column of FIG. 8B. It is noted that hovering over any column number displays a user's name.

If there is No Data for one of the PAIRED TO DO Categories shown in the subsequent Columns for a specific Individual, Team or Group identified in the First Column, then that Value is left Blank, and given the appropriate color-code.

Primary Views: There are three Top Level View options of the User Data:

The Productivity Score (not shown), for each Individual, Team or Group identified in the First Column, is computed for the PAIRED TO DO Categories as follows: It combines Two Key Calculations: The Efficiency Ratio and the Activity Score for each of the PAIRED TO DO Categories as referred to in column identifiers.

The Value of the Efficiency Ratio and the Activity Score for Multiple Users, Teams or Groups for each specific PAIRED TO DO Category as identified in FIG. 8B, are the Individual User Scores Summed Together and Averaged to determine the Team(s) or Group(s) score for each overall value in FIG. 9.

Multiplied together, the Efficiency Ratio and the Activity Score determine the hidden Productivity Score, for each of the PAIRED TO DO Categories shown in the subsequent Columns, referred to in column identifiers.

The Productivity Score can then be used to calculate the Projected Income for the User, Team or Group (this additional figure is shown when this View option is chosen).

The Efficiency Ratio–% Return (shown), for each Individual, Team or Group identified in the First Column, is computed as follows:

% Return–Actuals: For each Paired TO DO Category: The Inverse of the Ratio of the Cumulative History Actuals between the Input vs. Outcome TO DOs as described in FIG. 8B. Described here as a Percentage.

The Value of % Return–Actuals for Multiple Users, Teams or Groups for each specific PAIRED TO DO Category as identified in FIGS. 8A-B, are the Individual User Scores Summed Together and Averaged to determine the Team(s) or Group(s) score for each overall value in FIG. 9.

For One Input TO DO—$ Return: For each Pair: The Value of each Input TO DO can be expressed as an economic value.

This is determined for each Individual User for each specific paired TO DO Category by using the calculations described in FIG. 8B.

The Value of For One Input TO DO—$ Return: for Multiple Users, Teams or Groups for each specific paired TO DO Category as identified in FIG. 8B, are the Individual User Scores Summed Together and Averaged to determine the Team(s) or Group(s) score for each overall value in FIG. 9.

Note: This value can only be computed if there is an Economic Value set for the Outcome TO DO, or the second TO DO in the paired TO DO Category. This is explained more fully in FIG. 8B. If there is no Economic Value set for the Outcome TO DO in the PAIRING, then the number is left Blank.

Secondary Views: There are two Second Level View options of the User Data:

The Own Goals AVG (shown), for each Individual, Team or Group identified in the First Column, is computed for the paired TO DO Categories as follows:

Each score for the Primary View option chosen in "if there is no data" section above, is calculated by utilizing their Own Goals as a reference point.

Examples: An Individual User Efficiency Ratio is determined by comparing their Own Actuals to their own Goals, as shown in FIG. 8B. Similarly a Team Efficiency Ratio is determined by comparing the overall AVG. of the Team Actuals to their Team Goals, as determined from FIG. 8B.

The Total Goals AVG (not shown), for each Individual, Team or Group identified in the First Column, is computed for the PAIRED TO DO Categories as follows:

Each score for the Primary View option chosen in "if there is no data section" above, is calculated by utilizing their AVG Goals for the entire set of Users covered by the Entire Report as a reference point.

Examples: An Individual User Efficiency Ratio is determined by comparing their Own Individual Actuals as shown in FIG. 8B, to the Total AVG Goal for the entire set of Report Users. Similarly a Team Efficiency Ratio is determined by comparing their Own Team Actuals as shown in FIG. 8B, to the Total AVG Goal for the entire set of Report Users.

FIG. 10A depicts an embodiment of an easy business plan 1000A.

The entirety of the Business Plan screen will be covered in FIGS. 10A, B, and C. The business plan screen extends the power of the To Do goal setting by combining revenue and outcome goals with historical and/or calculated conversion ratios. This FIG. 10A addresses the revenue and outcome goal setting portion of the screen.

It is noted that a Plan can be created with no Revenue Goals, which would instead rely on Activity Goals for the entire Plan Length. In this case, the system would create a Plan using the methodology below but calculate using a non-financial outcome goal. The Financial Rows would not apply but there would still be Weekly or Recurring Goals calculated for each Category that support the Long-Term Plan.

The name could then be Long-Term Plan. In one example, for Health and Wellness, a user desires to lose 15 Pounds over the Plan Length. The application then calculates (based on conversion ratios for the Group/Team/User), how many Days of Exercise, and Days of Healthy Eating, etc. (for each of the various Categories), are required for each Week or Recurring Period, to keep the user on track for the Total Weight Loss Result by the end of the Plan Length.

Details of Interaction with Business Plan Screen, Section A:

Business Plans can be created for the Current Year and the Next Year. Next year business plans will automatically be activated on January 1st of the next year. However, any start date and any length plan can be chosen.

There are two types of Business Plans, Easy and Comprehensive.

Easy Business Plan—This is the most common use case.

Start Date for Plan Tracking—This allows the user to define when the plan is to come in effect.

Total Length of My Plan—This shows the number of weeks between the start date of the plan and the end of the year.

Actual Work Weeks—This is the Total Length of My Plan minus the number of Budgeted Time Off Weeks. In this example 52 total plan weeks–7 budgeted time off=45 Actual Work Weeks.

Budgeted Time Off/Vacation/Training—This shows the total number of weeks that will not be used in accomplishing To Dos in the user's tracker.

Estimate Below is Based On—This determines if the budget will be based on Number of Weeks in the Year or the Total Length of My Plan. In this example they are the same value.

Total Budgeted Revenue for the Number of Weeks Budgeted for—This is the multiplication of $ Average Income Earned from One Transaction and Goal Total Number of Transactions during the Plan. In this example that equates to $6000×30=$180,000 Total Budgeted Revenue.

$ Avg. Income Earned from One Transaction—This is the dollar value for one sale closed by the user.

Total # Transactions—This is the goal number of transactions (Outcomes) that the user wants to accomplish during the plan time period.

Pro-Rated Revenue Goal (Total Length of My Plan) Plan Weeks, Change My Current Revenue Goal, and Current Revenue Goal (Total Length of My Plan) Plan Weeks—These are redundant. They all equal $ Av. Income Earned from One Transaction*Total # Transaction (Primary Outcome Goal value).

Total Required (# Primary Output To Do)—This is taken from the Total # Transactions input field.

To Date Actual (# Primary Output To Do)—This value is taken from the plan-to-date cumulative primary output To Do value. This information is entered through FIG. 3A-C: Goal Tracker and Integrated Contact Tracker Update Screen: Automated Login or FIG. 5: Comment Tracker.

Date Remaining (# Primary Output To Do)—This is the difference between Total # Required (Primary Output To Do) and To Date Actual (# Primary Output To Do). In this example the value is 5 which is 30 Total Transaction−25 To Date Actual Sales Closed.

Avg. (# Primary Output To Do)−Total Actual Work Weeks in the Plan Per Week—This value is how many average weekly outcomes would need to be completed from the beginning of the plan to the end in order to achieve the Total # of Transactions. The value in this example is 0.67 which is 30 Total Transactions/45 Actual Work Weeks.

Avg(# Primary Output To Do) per # Work Weeks Left (when the value was last saved) Per Week—This value is how many average weekly Outcomes the user needs to achieve in order to achieve the Total Transactions for the remaining work weeks. This value is the number calculated when the user, manager/coach, or team leader last saved the business plan. In this example the value is 0.96 which equates to 5 To Date Remaining # Sales Closed/5.19 Work Weeks Remaining when the business plan was last saved.

Avg. (# Primary Output To Do) per Today's Work Weeks Left per Week—This value is how many average weekly Outcomes the user needs to achieve in order to achieve the Total Transactions for the remaining work weeks from today's date. In this example the value is 0.96 which equates to 5 To Date Remaining # Sales Closed/5.19 Work Weeks Remaining from Today's Date.

FIG. 10B depicts an embodiment of a comprehensive business plan 1000B.

The business plan screen extends the power of the To Do goal setting by combining revenue and outcome goals with historical and/or calculated conversion ratios. This FIG. 10B addresses the revenue and outcome goal setting portion of the screen.

Business Plans can be created for the Current Year and the Next Year. Next year business plans will automatically be activated on January 1st of the next year. However, ANY START DATE and ANY PLAN LENGTH can be chosen.

There are 2 types of Business Plans, Easy and Comprehensive

Comprehensive Business Plan—This is used when a user needs to calculate a budget in order to determine the number of sales required to achieve the budget.

Start Date for Plan Tracking—This allows the user to define when the plan is to come in effect.

Total Length of My Plan—This shows the number weeks between the start date of the plan and the end of the year.

Actual Work Weeks—This is the Total Length of My Plan minus the number of Budgeted Time Off. In this example 52 total plan weeks−7 budgeted time off=45 Actual Work Weeks.

Budgeted Time Off/Vacation/Training—This shows the total number of weeks that will not be used in accomplishing To Dos in the user's tracker.

Estimate Below is Based On—This determines if the budget will be based on Number of Weeks in the Year or the Total Length of My Plan. In this example they are the same value.

Living Expenses—This is the user's living expense value. This comes from the user's own budgeting.

Business Expenses—This is the user's business expense value. This comes from the user's own budgeting.

Retirement/Investment—This is the user's desired cumulative retirement and investment vale. This comes from the user's own budgeting.

Taxes—This is the user's estimated taxes during for the business plan time frame. This comes from the user's own budgeting.

Other/Misc—This value covers any expenses that were not covered in living expenses, business expenses, retirement/investment, or taxes.

Total Expenses—This is the cumulative value of all individual expenses.

Profit—This is the desired profit from the business plan time frame.

Total Budget Revenue (# Weeks from Budget Based On)—This is the cumulative value of all individual expenses plus profit.

$ Avg. Income Earned from One Transaction—This is the dollar value for one sale closed by the user.

Total # Transactions (for Primary Output Goal) (# Weeks from Budget Based On)—This is the Total # of Transactions (for the Primary Goal). This is calculated as Total Budgeted Revenue/$ Avg. Income Earned from One Transaction.

Pro-Rated Revenue Goal (Total Length of My Plan) Plan Weeks, Change My Current Revenue Goal, and Current Revenue Goal (Total Length of My Plan) Plan Weeks—These are redundant. They all equal $ Av. Income Earned from One Transaction*Total # Transaction (Primary Outcome Goal value).

Total Required (# Primary Output To Do)—This is taken from the Total # Transactions input field.

To Date Actual (# Primary Output To Do)—This value is taken from the plan-to-date cumulative primary output To Do value. This information is entered through FIGS. 3A-C: Goal Tracker and Integrated Contact Tracker Update Screen: Automated Login or FIG. 5: Comment Tracker.

Date Remaining (# Primary Output To Do)—This is the difference between Total # Required (Primary Output To Do) and To Date Actual (# Primary Output To Do). In this example the value is 5 which is 30 Total Transaction−25 To Date Actual Sales Closed.

Avg. (# Primary Output To Do)−Total Actual Work Weeks in the Plan Per Week—This value is how many average weekly Outcomes would need to be completed from the beginning of the plan to the end in order to achieve the Total # of Transactions. The value in this example is 0.67 which is 30 Total Transactions/45 Actual Work Weeks.

Avg. (# Primary Output To Do) per # Work Weeks Left (when the value was last saved) Per Week—This value is how many average weekly Outcomes the user needs to achieve in order to achieve the Total Transactions for the remaining work weeks. This value is the number calculated when the user, manager/coach, or team leader last saved the business plan. In this example the value is 0.96 which equates to 5 To Date Remaining # Sales Closed/5.19 Work Weeks Remaining when the business plan was last saved.

Avg. (# Primary Output To Do) per Today's Work Weeks Left per Week—This value is how many average weekly Outcomes the user needs to achieve in order to achieve the Total Transactions for the remaining work weeks from today's date. In this example the value is 0.96 which equates to 5 To Date Remaining # Sales Closed/5.19 Work Weeks Remaining from Today's Date.

FIG. 10C depicts an embodiment of goals and conversions 1000C. The goals and conversions depicted in FIG. 10C are also described and depicted with respect to at least FIGS. 3A-C, 8A-B, and 9.

FIG. 10C includes various information which will be described in further detail below.

Update Your Weekly Goals—This option allows the user to set an auto-reset on their goals per a designated time period. This function updates Weekly Goals so that the user's average efficiency ratio and average activity values are 100%.

The goals are automatically reset based on the calculated conversion ratios for the Individual/Team/Group for the selected History Period. For this example, the goals would reset every 2 weeks based on the individual's conversion ratios calculated over the most current 12 weeks.

The Reset Now option allows a user to reset their goals real-time based on the calculated conversion ratios for the Individual/Team/Group for the selected History Period. For this example, the goals would reset based on the individual's conversion ratios calculated over the most current 12 weeks.

My History—The user selects whether to base the Historical (ie. Calculated) goals on the conversion ratios calculated for the user (Individual), a Team of which the user is a member, or all the users (Group) that are participants of the tracker.

Starting and Ending (Dates)—This is the time frame used for the data which will determine the historic goals and conversion ratios.

Number of Weeks—This value is the number of periods that are encompassed by the Starting and Ending Dates.

To Do Goal Table Definitions—All examples will use the first row of data in the figure. The row in highlighted portion indicates the Primary Outcome Goal To Do.

There are two views of the table. One view shows only the basic values. The other view presents all data used to calculate all data in the table.

Column 1—Shows the order number of each To Do. My To Dos Column–Displays the title of each To Do.

Current Weekly Goals Column—These are the goal values that are currently being used to track the user's productivity.

My History Weekly Goals—These values are the goals that should be in place if the user were using the historic (calculated) conversion ratios. These numbers are calculated by multiplying the My History Conversion Ratios Normalized to 1 Outcome by desired goal of the Outcome To Do Goal. In this example 96 equals 100 (My History Conversion Ratios=1 Outcome)*0.96 (# of Sales Closed).

History vs. Current Overall Percentage—This is the average of all values in this column.

History vs. Current Percentage Column—These values are the percent difference between the current and historic goals. In this example, 52% represents 50 (Current Weekly Goal)/96 (Historic Weekly Goal).

Change to My History or Back to Current Weekly Column—This column contains actions to select whether to user current or historically calculated goals. There is an option to use all of one or the other. The same action as used in FIG. 8B.

Current Goal Conversion Ratios=1 Outcome Column—These values normalize the current weekly goals to 1 Outcome. In this example, 52.08 equals 50 (Weekly Current Goal)/0.96 (Weekly Primary Outcome Goal).

My History Conversion Ratios=1 Outcome Column—These values are the calculated conversion ratios from historical data. This information comes from FIG. 8B.

Discussion set forth in detail the operation of some example methods of operation of embodiments. With reference to the figures and flow diagrams illustrate example procedures used by various embodiments. The description and figures include some procedures that, in various embodiments, are carried out by a processor under the control of computer-readable and computer-executable instructions. In this fashion, procedures described herein and in conjunction with flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams such procedures are examples. That is, embodiments are well suited to performing various other procedures or variations of the procedures recited in the flow diagrams. Likewise, in some embodiments, the procedures in flow diagrams may be performed in an order different than presented and/or not all of the procedures described in one or more of these flow diagrams may be performed. It is further appreciated that procedures described in flow diagrams may be implemented in hardware, or a combination of hardware with firmware and/or software.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

What is claimed is:

1. A computer-implemented method for goal tracking, comprising:

receiving, at a computing system, an opt in for each individual user, the opt in provided by said each individual user, said opt in adding said each individual user to a goal tracking system;

accessing, at said computing system, goal tracking information for said goal tracking system, wherein said goal tracking information comprises a plurality of individual user activities for said each individual user, contact information associated with said plurality of individual user activities, a plurality of goals corresponding to said plurality of said individual user activities, and actuals corresponding to each of said plurality of goals, said contact information comprising a plurality of separate contacts, wherein each of said plurality of individual user activities is applicable to each of said plurality of separate contacts, and wherein each of said plurality of separate contacts is able to be associated with each of said plurality of individual user activities, wherein said goal tracking information includes information corresponding to current ones of said plurality of goals corresponding to said plurality of said individual user activities, said goal tracking information further including information corresponding to future ones of said plurality of goals corresponding to said plurality of said individual user activities, said information corresponding to said future ones of said plurality of goals corresponding to said plurality of said individual user activities is applicable to each of said plurality of separate contacts;

said goal tracking information being automatically obtained via a plurality of templates and not manually input by said each individual user;

automatically correlating, at the computing system, said goal tracking information between various reporting screens;

periodically and automatically generating, at the computing system, a report, that is pushed to at least one of said each individual user, comprising said goal tracking information, wherein said report is updated in real time to a plurality of devices, without requiring effort on a part of said each individual user, wherein said report can generate a gap number for at least one of said plurality of individual user activities, said gap number indicating a difference between said plurality of goals corresponding to said plurality of said individual user activities and an actual level of achievement for said plurality of said individual user activities;

periodically and automatically ranking, at the computing system, said goal tracking information for said each individual user among a group of said each individual users, wherein said group of said individual users comprises:
  a plurality of said individual users defined as members of said group; and
  a team captain, said team captain to:
    add one or more individual users from said group of said individual users to said group,
    remove one or more of said each individual user from said group,
    assign at least one of said plurality of goals corresponding to said plurality of said individual user activities to at least one of said each individual user,
    update said goals for at least one of said each individual user of said group,
    assign goals to said group as a whole, and
    update said goals to said group as said whole;
displaying said ranking in real-time for said each individual user on a scoreboard; and
automatically resetting, at said computing system, said actual level of achievement for said goals to zero at an end of each designated time period with no input from said each individual user while keeping said goals for a subsequent time period.

2. The computer-implemented method of claim 1, wherein said goal tracking information further comprises:
  historical data of actually achieved individual user activities.

3. The computer-implemented method of claim 1, wherein said goal tracking information further comprises:
  a time period.

4. The computer-implemented method of claim 1, wherein said contact information is selected from a group consisting of: name, address, and phone number.

5. The computer-implemented method of claim 1, wherein said accessing goal tracking information further comprises:
  accessing goal tracking information from a database.

6. The computer-implemented method of claim 1, further comprising:
  automatically updating said goal tracking information in response to individual user input of said goal tracking information.

7. The computer-implemented method of claim 1, further comprising:
  automatically displaying updated goal tracking information in response to individual user input of updated goal tracking information.

8. The computer-implemented method of claim 1, further comprising:
  color coding said report to indicate a percentage of achievement of said individual user activities.

9. The computer-implemented method of claim 1, further comprising:
  enabling individual user interaction with said goal tracking information in said report.

10. The computer-implemented method of claim 1, further comprising:
  accessing said goal tracking information from a mobile device.

11. The computer-implemented method of claim 1, further comprising:
  displaying said goal tracking information on a mobile device.

12. A non-transitory computer-readable storage medium having instructions embodied therein that when executed cause a computer system to perform a method for goal tracking, said method comprising:
  receiving, at a computing system, an opt in for each individual user, said opt in provided by said each individual user, said opt in adding said each individual user to a goal tracking system;
  accessing, at said computing system, goal tracking information for said goal tracking system, wherein said goal tracking information comprises a plurality of individual user activities for said each individual user, contact information associated with said plurality of individual user activities, a plurality of goals corresponding to said plurality of said individual user activities, and actuals corresponding to each of said plurality of goals, said contact information comprising a plurality of separate contacts, wherein each of said plurality of individual user activities is applicable to each of said plurality of separate contacts, and wherein each of said plurality of separate contacts is able to be associated with each of said plurality of individual user activities, wherein said goal tracking information includes information corresponding to current ones of said plurality of goals corresponding to said plurality of said individual user activities, said goal tracking information further including information corresponding to future ones of said plurality of goals corresponding to said plurality of said individual user activities, said information corresponding to said future ones of said plurality of goals corresponding to said plurality of said individual user activities is applicable to each of said plurality of separate contacts;

said goal tracking information being automatically obtained via a plurality of templates and not manually input by said each individual user;

automatically correlating, at the computing system, said goal tracking information between various reporting screens;

periodically and automatically generating, at the computing system, a report, that is pushed to at least one of said each individual user, comprising said goal tracking information, wherein said report is updated in real time to a plurality of devices, without requiring effort on a part of said each individual user, wherein said report can generate a gap number for at least one of said plurality of individual user activities, said gap number indicating a difference between said plurality of goals corresponding to said plurality of said individual user activities and an actual level of achievement for said plurality of said individual user activities;

periodically and automatically ranking, at the computing system, said goal tracking information for said each individual user among a group of said each individual users, wherein said group of said individual users comprises:
- a plurality of said each individual user defined as members of said group; and
- a team captain, said team captain to:
  - add one or more individual users from said group of said individual to said group,
  - remove one or more of said each individual user from said group,
  - assign at least one of said plurality of goals corresponding to said plurality of said individual user activities to at least one of said each individual user,
  - update said goals for at least one of said each individual users of said group,
  - assign goals to said group as a whole, and
  - update the goals to said group as the whole;

displaying the ranking in real-time for said each individual user on a scoreboard; and automatically resetting, at the computing system, said actual level of achievement for said goals to zero at an end of each designated time period with no input from said each individual user while keeping said goals for a subsequent time period.

13. The non-transitory computer-readable storage medium of claim 12, wherein said goal tracking information further comprises:
    historical data of actually achieved individual user activities.

14. The non-transitory computer-readable storage medium of claim 12, wherein said goal tracking information further comprises:
    a selected time period.

15. The non-transitory computer-readable storage medium of claim 12, wherein said contact information is selected from a group consisting of: name, address, and phone number.

16. The non-transitory computer-readable storage medium of claim 12, wherein said accessing goal tracking information further comprises:
    accessing goal tracking information from a database.

17. The non-transitory computer-readable storage medium of claim 12, further comprising:
    automatically updating said goal tracking information in response to individual user input of said goal tracking information.

18. The non-transitory computer-readable storage medium of claim 12, further comprising:
    enabling individual user interaction with said goal tracking information in said report.

19. The non-transitory computer-readable storage medium of claim 12, further comprising:
    accessing said goal tracking information from a mobile device.

20. The non-transitory computer-readable storage medium of claim 12, further comprising:
    displaying said goal tracking information on a mobile device.

* * * * *